(12) United States Patent
Oi

(10) Patent No.: US 6,320,940 B1
(45) Date of Patent: Nov. 20, 2001

(54) NETWORK TERMINATION DEVICE WITH AUTOMATIC DETECTION AND CORRECTION OF CIRCUIT POLARITY

(75) Inventor: Masakazu Oi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/394,770

(22) Filed: Sep. 10, 1999

(30) Foreign Application Priority Data

Feb. 15, 1999 (JP) ................................................. 11-035132

(51) Int. Cl.⁷ ..................................................... H04M 1/24

(52) U.S. Cl. ..................................... 379/27.01; 379/26.01; 379/29.04; 379/32.04; 379/399.01

(58) Field of Search ................................... 379/1, 12, 22, 379/23, 27, 29, 30, 32, 34

(56) References Cited

U.S. PATENT DOCUMENTS

| | | | | |
|---|---|---|---|---|
| 4,710,949 | * | 12/1987 | Ahuja ........................................ | 379/26 |
| 5,125,027 | * | 6/1992 | Blaszykowski et al. ............ | 379/399 |
| 5,764,755 | * | 6/1998 | Chen ...................................... | 379/399 |
| 5,970,099 | * | 10/1999 | Zhou ...................................... | 375/285 |

FOREIGN PATENT DOCUMENTS 9-224072    8/1997  (JP) .

\* cited by examiner

Primary Examiner—Binh Tieu
(74) Attorney, Agent, or Firm—Rosenman & Colin, LLP

(57) ABSTRACT

A network termination device which will operate correctly even if its connection to a central office has reverse polarity. A network termination device at customer premises is connected to a line termination device located at a central office via a two-wire subscriber loop. If this connection was made with reverse polarity, the supply voltage provided by the line termination device would oscillate at specific intervals, alternating between normal polarity and reverse polarity. In such a case, a polarity switch controller in the network termination device directs its local polarity reversing switch to alternate the polarity at predetermined intervals longer than the cycle time of the above oscillation. This produces such a situation where a reverse supply voltage is present and the polarity reversing switch is in reverse mode, resulting in correct polarity as a whole. Under this condition, frame synchronization can be achieved between the peer devices, and a circuit termination unit thus asserts a synchronization indication signal. Upon receipt of this signal, the polarity switch controller commands the polarity reversing switch to stop changing and hold the current polarity. Eventually, a normal connection path is restored between the two devices, despite of the reversed subscriber loop wiring.

5 Claims, 24 Drawing Sheets

NETWORK TERMINATION DEVICE WITH AUTOMATIC DETECTION AND CORRECTION OF CIRCUIT POLARITY

BACKGROUND OF THE INVENTION

1. Field of the Invention

The present invention relates to a network termination device, and more particularly to a network termination device which determines whether the subscriber loop is in an idle state or busy state by detecting the polarity of a dc voltage supplied from local office equipment.

2. Description of the Related Art

The recent proliferation of the Internet has brought about increasingly widespread deployment of the Integrated Services Digital Network (ISDN) for home use. While conventional subscriber loops are provided originally for analog signal transmission, the ISDN makes it possible to utilize the existing metallic wires to transport high-speed digital signals.

The ISDN basic rate services are based on a reference model shown in FIG. 18, which is defined in the TTC standard JT-G961 (Digital Transmission System on Metallic Local Lines for ISDN Basic Rate Access). TTC stands for the Telecommunication Technology Committee (Japan), and JT-G961 is based on the ITU-T Recommendation G.961. Referring to FIG. 18, a public switched telephone network (PSTN) 1 is a telecommunications network that is accessible to the general public. An exchange termination device 2 and line termination devices 3a to 3c are deployed at a central office. The exchange termination device 2 permits a call from a subscriber to reach the desired destination by making an appropriate circuit connection. Being disposed at the exchange end of each metallic subscriber loop 4, the line termination devices 3a to 3c serve as adapters that perform various operations for digital data communication services. The subscriber loop 4 is physically a twisted pair of copper wires, originally prepared for analog voice signal transmission.

In the system of FIG. 18, the subscriber-side equipment includes: a network termination device 5, subscriber terminals 7a and 7b, a terminal adapter 8, and an analog telephone set 9. Located at the subscriber end of the metallic subscriber loop 4, the network termination device 5 provides various functions as the peer system of the line termination device 3a. The subscriber terminals 7a and 7b, called terminal equipment (TE) in ISDN terminology, are digital telecommunications equipment such as digital telephone sets and G4 standard-compatible fax machines. The terminal adapter 8 serves as a bridge to make the conventional analog telephone set 9 compatible with the ISDN protocol of S-bus 6, converting conventional analog telephone signals to/from ISDN digital signals.

The metallic subscriber loop 4, known as the U interface in ISDN terminology, carries basic-rate digital information between the network termination device 5 and the line termination device 3a. Since the U interface is not internationally standardized, various implementations are possible for the metallic subscriber loop 4. In the United States, echo canceling techniques are used to provide simultaneous full-duplex transmission. Many other countries, on the other hand, use time-compression multiplexing techniques, which are also known as the ping-pong method.

FIG. 19 is a block diagram which presents the details of the line termination device 3 and network termination device 5 in the system of FIG. 18. Here, the symbols "L1" and "L2" represent two individual wires constituting the metallic subscriber loop 4. FIG. 19 shows that the line termination device 3 comprises: a power supply 30, a current detector 31, a DC-AC splitter/combiner 32, a polarity reversing switch 33, a circuit termination unit 34, and a switch controller 35.

The power supply 30 provides the network termination device 5 with electric power. FIG. 20 shows a voltage-current plot representing the output characteristics of the power supply 30. Acting as a load of this power supply 30, the network termination device 5 exhibits a high circuit impedance when in the on-hook (or idle) state, and a lower impedance when in the off-hook (or busy) state. In the former situation, the power supply 30 functions as a constant voltage source, while, in the latter situation, it serves as a constant current source, as can be seen from FIG. 20. The current detector 31 monitors the load current of the power supply 30 and provides the switch controller 35 with a detection signal that indicates whether the current exceeds a predetermined threshold level.

Referring back to FIG. 19, the DC-AC splitter/combiner 32 allows a direct current from the power supply 30 to pass through to the polarity reversing switch 33. Simultaneously, it permits the circuit termination unit 34 to send an outgoing data signal to the polarity reversing switch 33, while preventing the signal from leaking to the power supply 30. The DC-AC splitter/combiner 32 also receives an incoming data signal from the network termination device 5 via the polarity reversing switch 33, and delivers it solely to the circuit termination unit 34.

The polarity reversing switch 33, composed of four switches S1 to S4, manipulates the polarity of the supply voltage, when sending it out to the network termination device 5. More specifically, the polarity reversing switch 33 changes over the supply voltage from normal polarity to reverse polarity, or vise versa, by alternating its internal connection paths according to control commands from the switch controller 35. When the switches S1 and S4 are turned on, a straight connection path is made to place a positive voltage on the wire L1 with respect to the other wire L2. This is referred to as the "normal polarity." Oppositely, when the switches S2 and S3 are turned on, a crossed connection path is established so that a positive voltage will appear on the wire L2 with respect to the other wire L1. This is referred to as the "reverse polarity."

The circuit termination unit 34 performs, for example, bitrate conversion of data signals exchanged between the exchange termination device 2 and network termination device 5. The switch controller 35 governs the polarity reversing switch 33 according to the aforementioned detection signal received from the current detector 31. The switch controller 35 has a dead band which eliminates any possible instability in the current detection during a transitional period when the supply voltage changes from normal polarity to reverse polarity. It also contributes toward increasing noise immunity. Actually, this dead band is realized as a masking function with a predetermined time constant τ.

FIG. 19 also shows that the network termination device 5 comprises: a DC-AC splitter/combiner 50, a diode 51, a switch 52, a diode 53, an internal power supply 54, a circuit termination unit 55, and a call request detector 56. The structure and function of the DC-AC splitter/combiner 50 are similar to those of the aforementioned DC-AC splitter/combiner 32 in the line termination device 3. In short, only a DC voltage appears at the left-hand port of the DC-AC splitter/combiner 50, while data signals at the bottom port.

The diode 51 applies the DC voltage to the switch 52, only when it is with the normal polarity. The switch 52 comprises a semiconductor switch, which is activated by the call request detector 56 when it has detected a call originated from a subscriber terminal (not shown in FIG. 19).

The diode 53 prevents the internal power supply 54 from receiving a DC voltage from the line termination device 3 that is working in normal polarity mode. The internal power supply 54 is typically a DC-DC converter. Operating only with a reverse-polarity DC voltage, it provides a predetermined voltage(s) to other portions of the network termination device 5. As can be seen from the above, the internal power supply 54 will appear to the line termination device 3 as a high-impedance load when a normal-polarity voltage is applied, but as a low-impedance load when a reverse-polarity voltage is applied.

The circuit termination unit 55 performs bitrate conversion of data signals that the line termination device 3 sends and receives to/from terminal equipment including the subscriber terminals 7a and 7b. This circuit termination unit 55 has a power-on reset function that initializes itself when the internal power supply 54 begins to operate. The call request detector 56 detects a call request signal originating at the subscriber terminals 7a and 7b or terminal adapter 8, and controls the switch 52 accordingly.

The next section will explain how the above conventional system operates when a call is originated or received.

(1) When a call is originated

When the network termination device 5 is in an idle state, the line termination device 3 supplies a DC voltage with normal polarity since the switches S1 and S4 in the polarity reversing switch 33 are closed. Hereafter, the terms "normal supply mode" and "reverse supply mode" will be used, if appropriate, to represent two opposite states of the supply voltage: normal polarity and reverse polarity.

FIG. 21 shows how the conventional system handles a call request from subscriber terminals. Standing by in normal supply mode, the network termination device 5 initially appears to the line termination device 3 as a high-impedance load, because its internal switch 52 is open. The power supply 30 thus operates as a constant voltage source, and accordingly, little current flow is observed between the line termination device 3 and network termination device 5.

Suppose here that the subscriber terminal 7a or 7b has placed a call in the above situation, as shown in (A) of FIG. 21. The call request detector 56 then detects this call request signal and turns on the switch 52, resulting in a low-impedance state of the network termination device 5. This triggers an increase of the load current (or subscriber loop current) flowing from the line termination device 3 to the network termination device 5. The current soon exceeds the predetermined threshold level indicated by the broken lines in FIG. 21, thus causing the power supply 30 to switch its operation to constant-current mode. As a result, the increase of the subscriber loop current stops when it reaches a little above the threshold level.

Observing this change in the current value, the current detector 31 notifies the switch controller 35 of the change. The switch controller 35 then activates its integral masking mechanism to filter out spurious transient events. More specifically, it generates a command to the polarity reversing switch 33 to reverse the connection path, only when the observed current value continuously exceeds the threshold for more than the predetermined time period τ. The resultant reverse voltage is applied to the network termination device 5. FIG. 21 shows the detection signal (B) produced by the current detector 31, together with the masked detection signal (C) produced inside the switch controller 35.

In reverse supply mode, the diode 51 in the network termination device 5 is turned off, thus blocking any current flowing into the switch 52. On the other hand, the internal power supply 54 becomes active since the other diode 53 is turned on. With the reverse voltage supplied from the line termination device 3, the internal power supply 54 begins to energize the circuit termination unit 55. The circuit termination unit 55 initializes itself by its built-in power-on reset function at the low-to-high transition of the internal supply voltage (D). A call connection procedure begins when this power-on reset is completed.

(2) When a Call is Received

FIG. 22 shows how the conventional system handles an incoming call request. Suppose that the circuit termination unit 34 has received a call request from the exchange termination device 2. To notify the remote end of the presence of an incoming call request, the circuit termination unit 34 controls the polarity reversing switch 33 through the switch controller 35 so that a reverse voltage be sent to the network termination device 5, as shown in (A) of FIG. 22. This is known as the reverse battery signaling.

Now that the line termination device 3 begins to feed in reverse supply mode, the network termination device 5 consumes a larger current because the internal power supply 54 is activated. This causes the current detector 31 in the line termination device 3 to detect the increased current; it then asserts the current detection signal (B), and hence the masked detection signal (C). The switch controller 35 maintains the reverse supply mode.

In the network termination device 5, the activated internal power supply 54 begins to energize the circuit termination unit 55, triggering its built-in power-on reset function, as shown in (D) of FIG. 22. Accordingly, the circuit termination unit 55 can handle the incoming call request.

The following section will now discuss some problems concerning incorrect connection of subscriber loops. As mentioned earlier, the metallic subscriber loop 4 interconnecting the line termination device 3 and network termination device 5 is originally designed for analog voice signal transmission. In the days of analog telephone systems, the polarity of wire connection was not so important. While crossed connection may sometimes happen during the installation of subscriber loops to home, many analog telephone sets would operate correctly regardless of whether the wires are connected straightly or reversely. FIG. 23 shows such a situation where the network termination device 5 is connected to the metallic subscriber loop 4 in a twisted manner. The operation in this case will now be described below, with reference to FIG. 24.

FIG. 24 is a timing diagram which explains what would happen in the case of reverse connection. When a physical cable connection is made, the line termination device 3 immediately starts to feed electrical power to the network termination device 5 in normal mode. From the viewpoint of the network termination device 5, however, the supplied voltage appears as if the line termination device 3 provided a reverse voltage. Accordingly, the internal power supply 54 is activated, thus drawing a current from the power supply 30 over the metallic subscriber loop 4. Now that a relatively large subscriber loop current is observed, the current detector 31 in the line termination device 3 informs the switch controller 35 of the current consumption, asserting a current detection signal (B) shown in FIG. 24. This produces a delayed, or masked, signal (C). The switch controller 35 regards this signal as a call request from the network termination device 5, thus directing the polarity reversing switch 33 to reverse its internal connection. Here, the line termination device 3 attempts to send a reverse voltage to the network termination device 5.

The supplied voltage, however, appears to be of normal polarity, when viewed from the network termination device 5. The internal power supply 54 is now de-energized; the circuit termination unit 55 is unable to operate. The switch 52, on the other hand, is kept open because no call request has been sensed by the call request detector 56. After all, no power is consumed within the network termination device 5. In other words, the network termination device 5 is in a high-impedance state, when viewed from the line termination device 3. Accordingly, the current detector 31 negates the current detection signal to the switch controller 35, and the polarity reversing switch 33 returns to normal supply mode.

As described above, the line termination device 3 has changed the supply mode from "normal" to "reverse," and then back to "normal." It will repeat the same operations endlessly, switching alternately between the reverse and normal supply modes at specific time intervals, as shown in FIG. 24. In this situation, the line termination device 3 cannot accept any call requests from the relevant subscriber terminals, nor can it handle incoming calls properly when so requested by the exchange termination device 2.

To avoid the above oscillation, it is necessary to connect the wires with correct polarity. Particularly when installing a new network termination device 5 at the end of an existing metallic subscriber loop 4, one should remember to check the polarity of wiring at the wall receptacle of interest, before plugging in the cord of the network termination device 5. While portable line testing tools are available, this polarity check can be a factor to increase the time and labor for the installation. When it is revealed that the existing wiring is incorrect, one has to change the polarity by disassembling and reassembling the receptacle. This requires, however, a certain level of expertise that ordinary users may not always have.

SUMMARY OF THE INVENTION

Taking the above into consideration, an object of the present invention is to provide a network termination device which will operate correctly regardless of the polarity of its physical connection to a corresponding line termination device.

To accomplish the above object, according to the present invention, there is provided a network termination device which recognizes an idle state or a busy state of a subscriber loop by testing the polarity of a supply voltage provided from a central office. This network termination device comprises: a polarity reversing switch which switches between normal polarity and reverse polarity of connection to the central office; a detector which detects whether the polarity of connection to the central office is normal or reverse; and a polarity switch controller changing unit which changes the polarity of connection by controlling the switching unit in accordance with the detection result obtained by the detector.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will now be described below with reference to the accompanying drawings.

Figure 1:
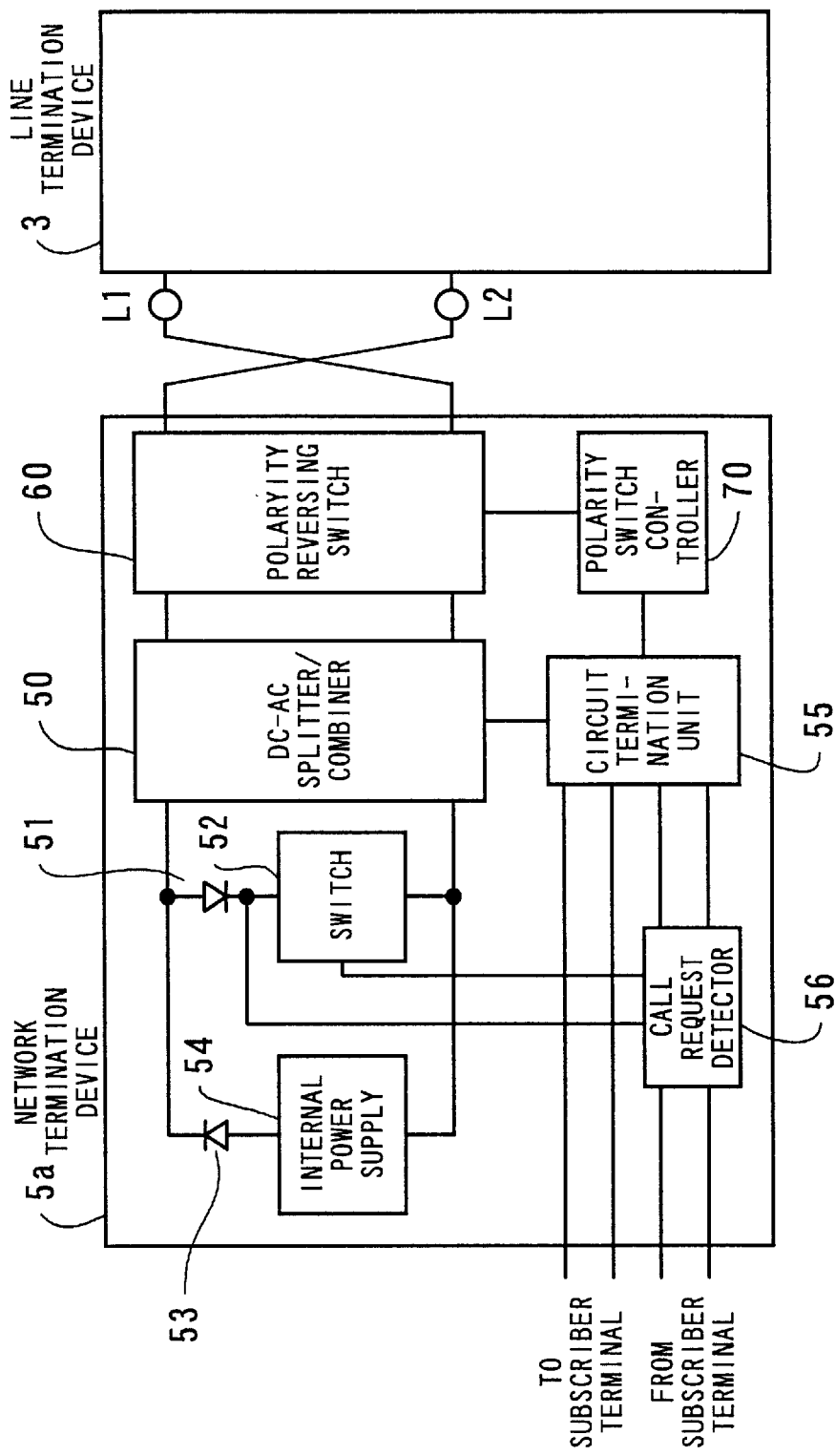
FIG. 1 is a block diagram of a typical system configuration according to a first embodiment of the present invention.

FIG. 1 is a block diagram of a network termination device 5a according to a first embodiment of the present invention. Since this network termination device 5a shares many common elements with the one shown in FIG. 19 explained earlier, the following section will focus on distinctive elements of the present invention, while affixing like reference numerals to like elements. Compared with the conventional network termination device 5 shown in FIG. 19, the proposed network termination device 5a comprises two additional elements: a polarity reversing switch 60 and a polarity switch controller 70. The other elements of the network termination device 5a would operate as in the system of FIG. 19.

Figure 2:
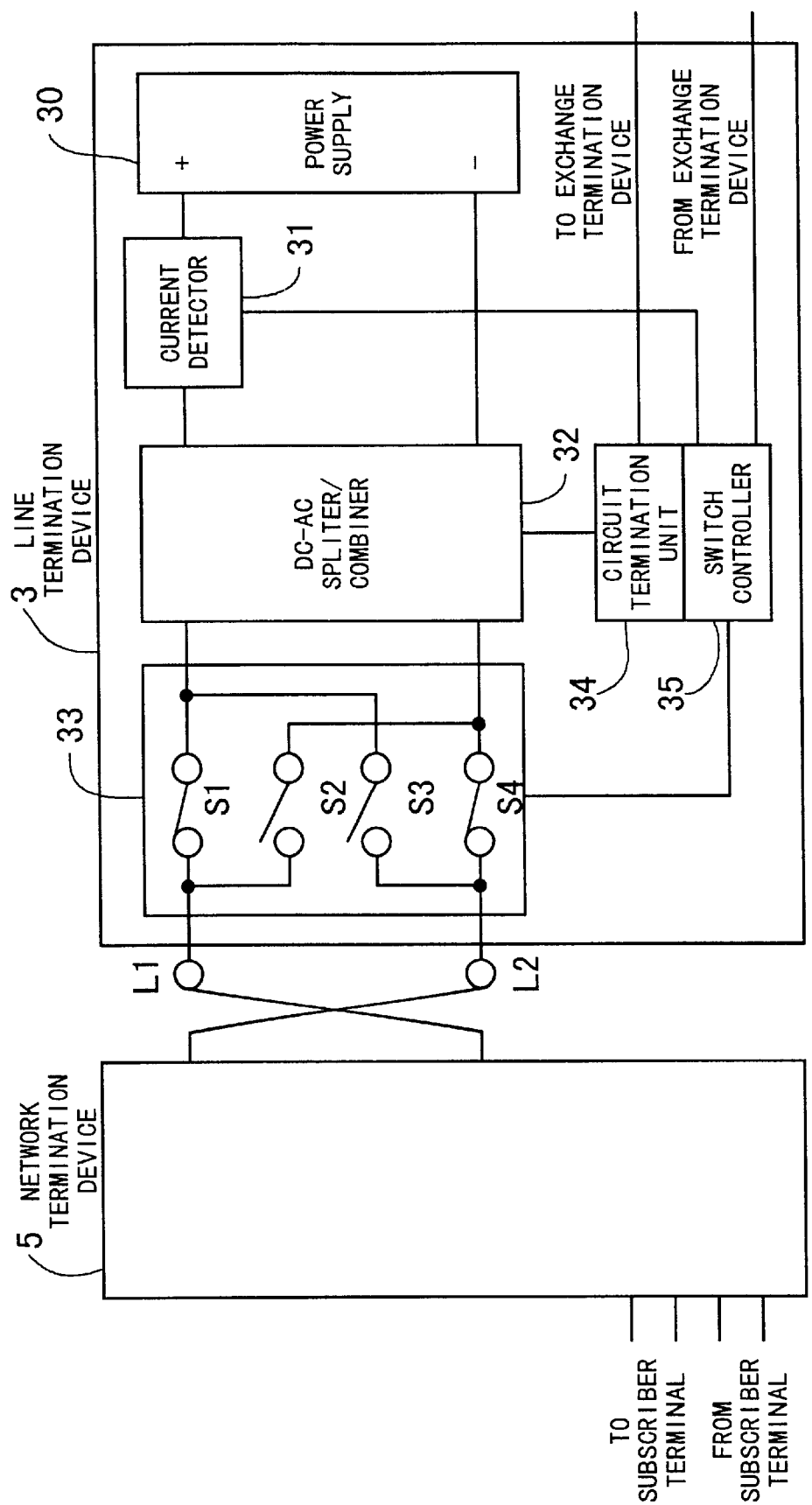
FIG. 2 is a diagram which shows the details of a line termination device shown in FIG. 1.
Figure 19:
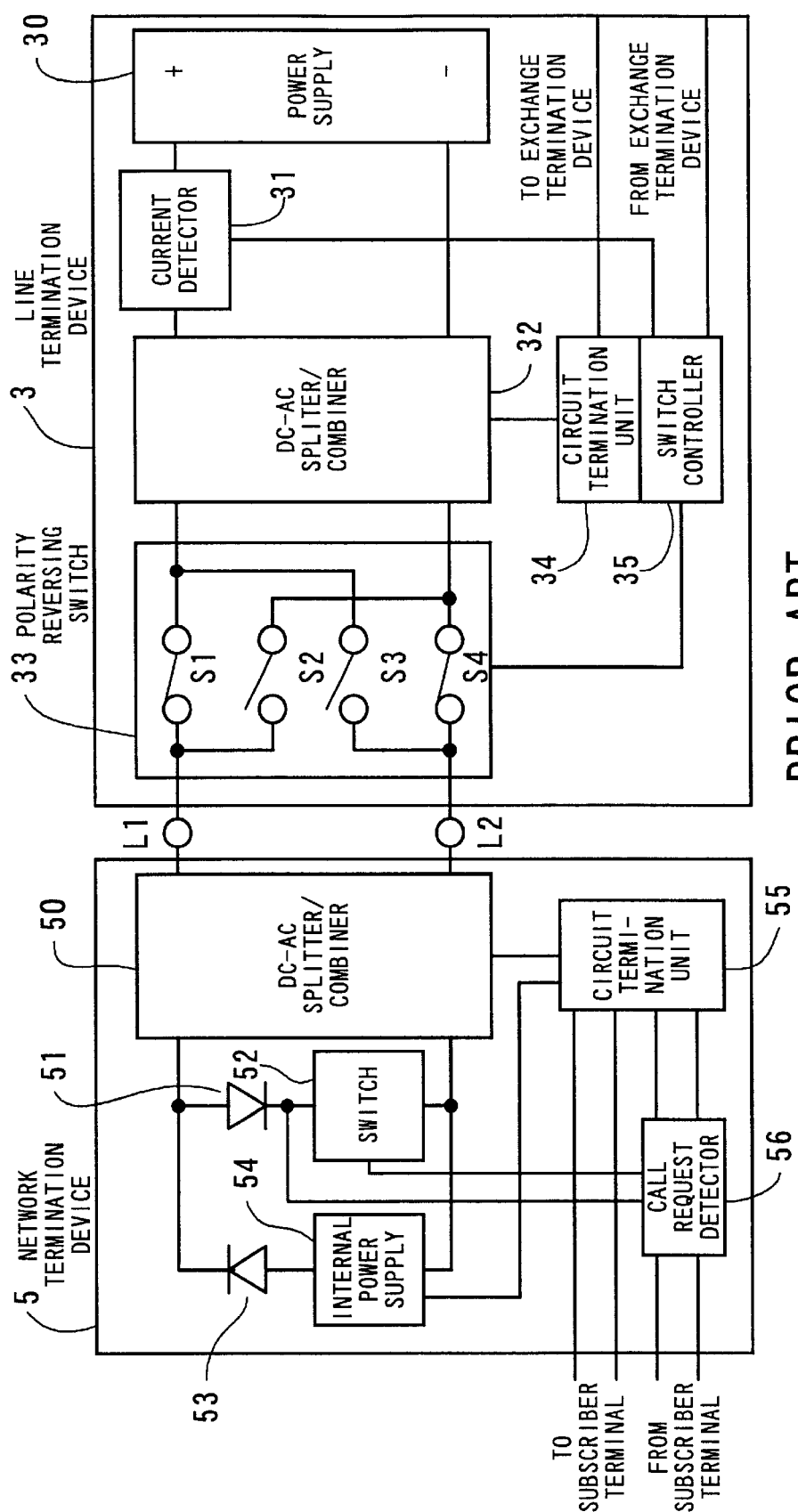
FIG. 19 is a block diagram which shows the details of a line termination device and a conventional network termination device shown in FIG. 18.

FIG. 2 illustrates the details of the line termination device 3 shown in FIG. 1, which is actually the same as what can be seen in FIG. 19. The following description will first mention the detailed hardware configuration of this line termination device 3, before explaining the details of the proposed network termination device 5a.

Figure 3:
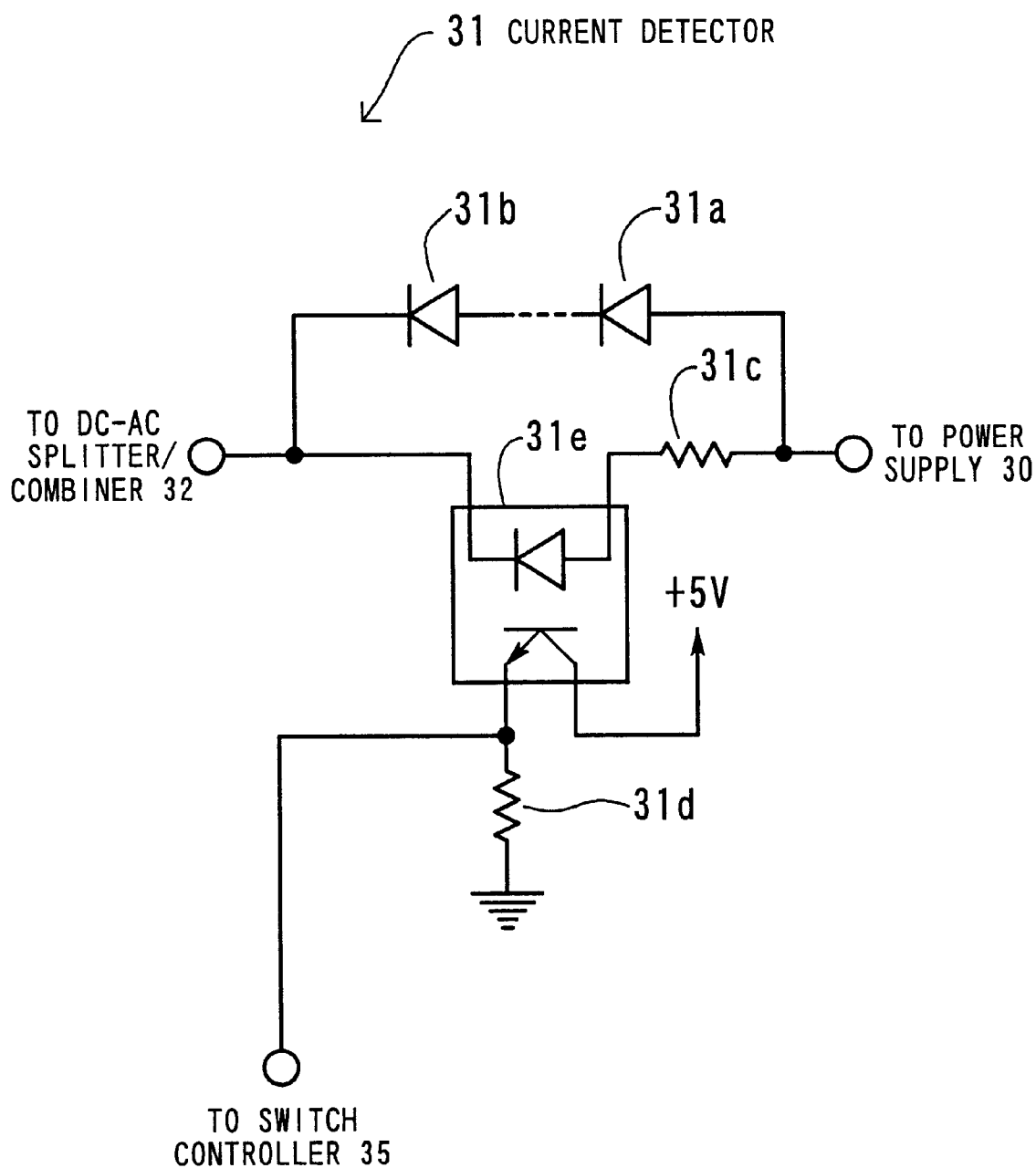
FIG. 3 is a schematic circuit diagram which shows the details of a current detector shown in FIG. 2.
Figure 20:
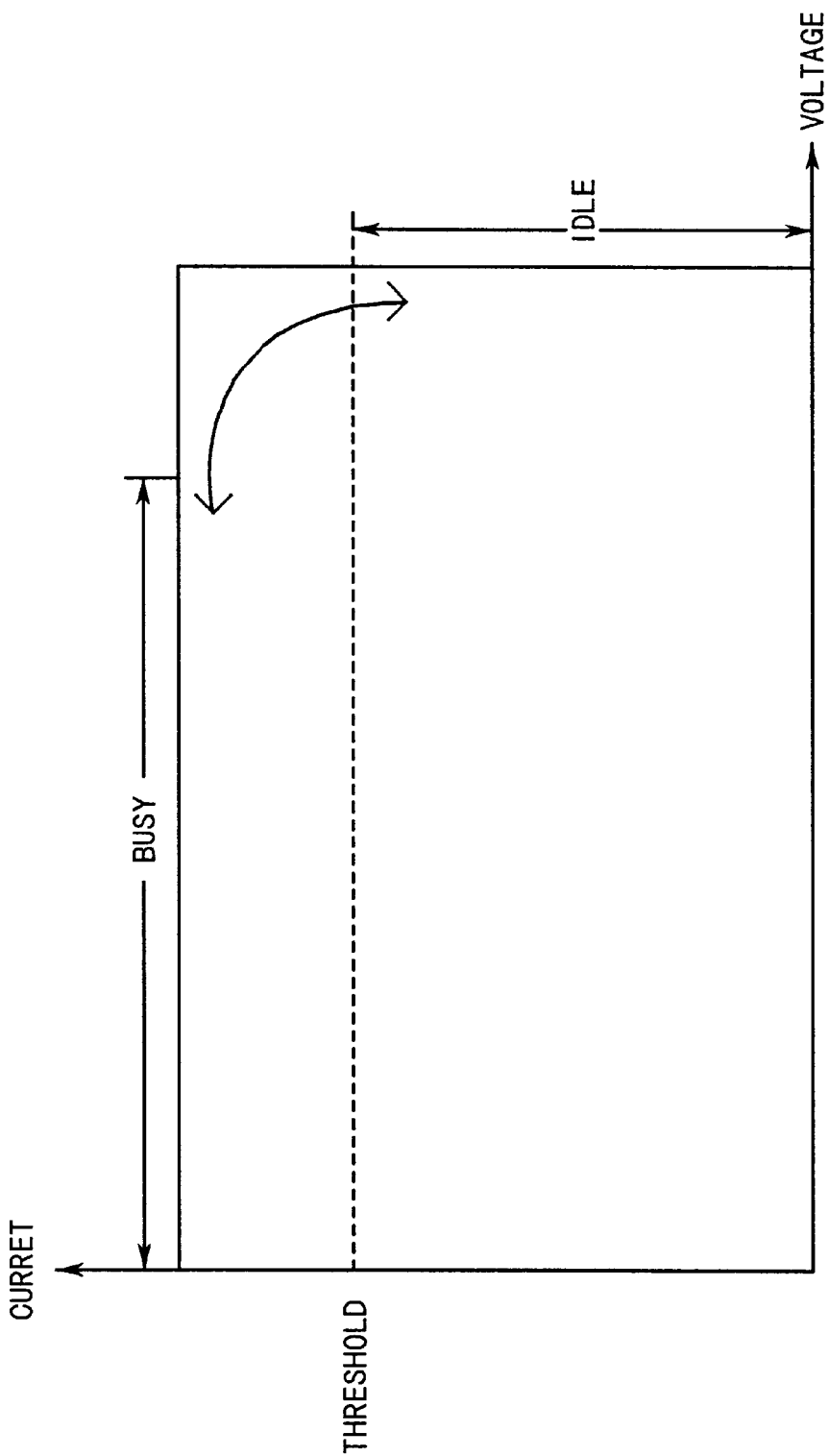
FIG. 20 is a current-voltage plot showing a typical output characteristic of a power supply being employed in the line termination device shown in FIG. 19.
Figure 21:
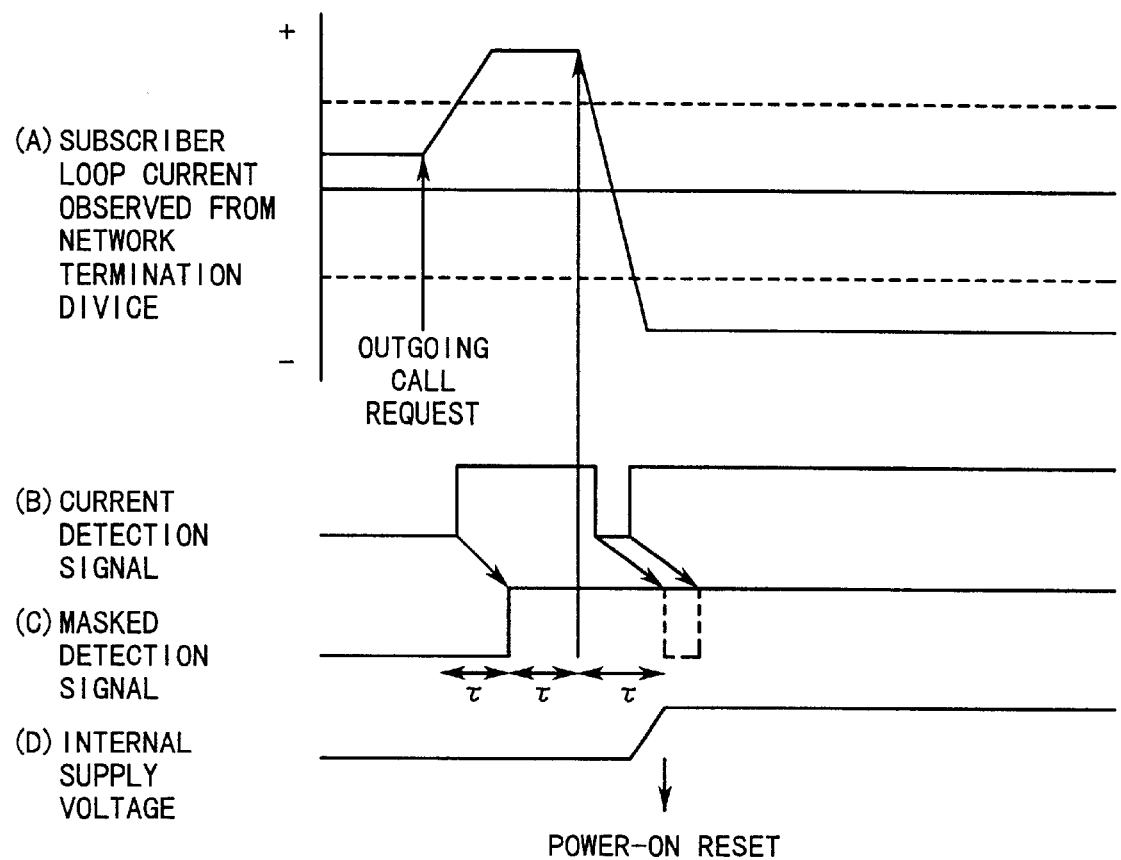
FIG. 21 is a timing diagram which explains how the conventional system of FIG. 19 will operate when a call request is received from a subscriber terminal.
Figure 22:
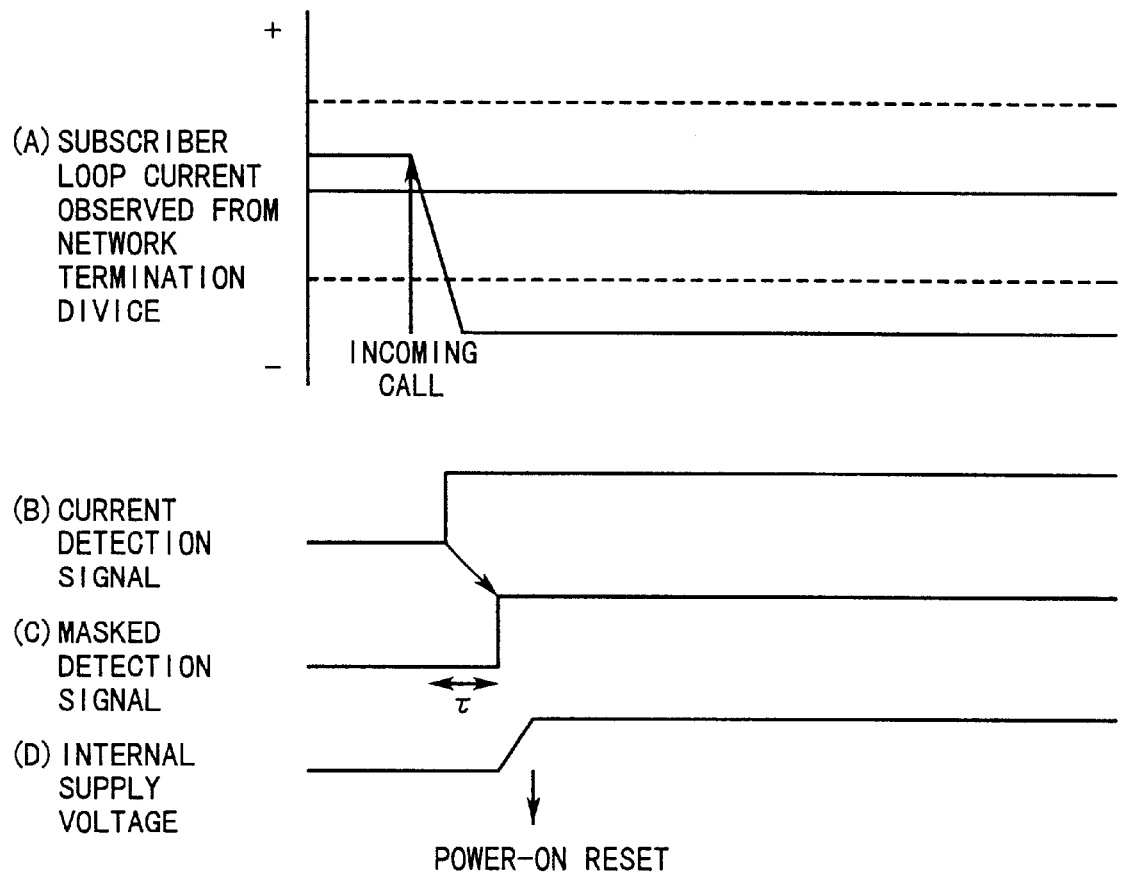
FIG. 22 is a timing diagram which explains how the conventional system of FIG. 19 will operate when an incoming call has arrived at the line termination device.
Figure 23:
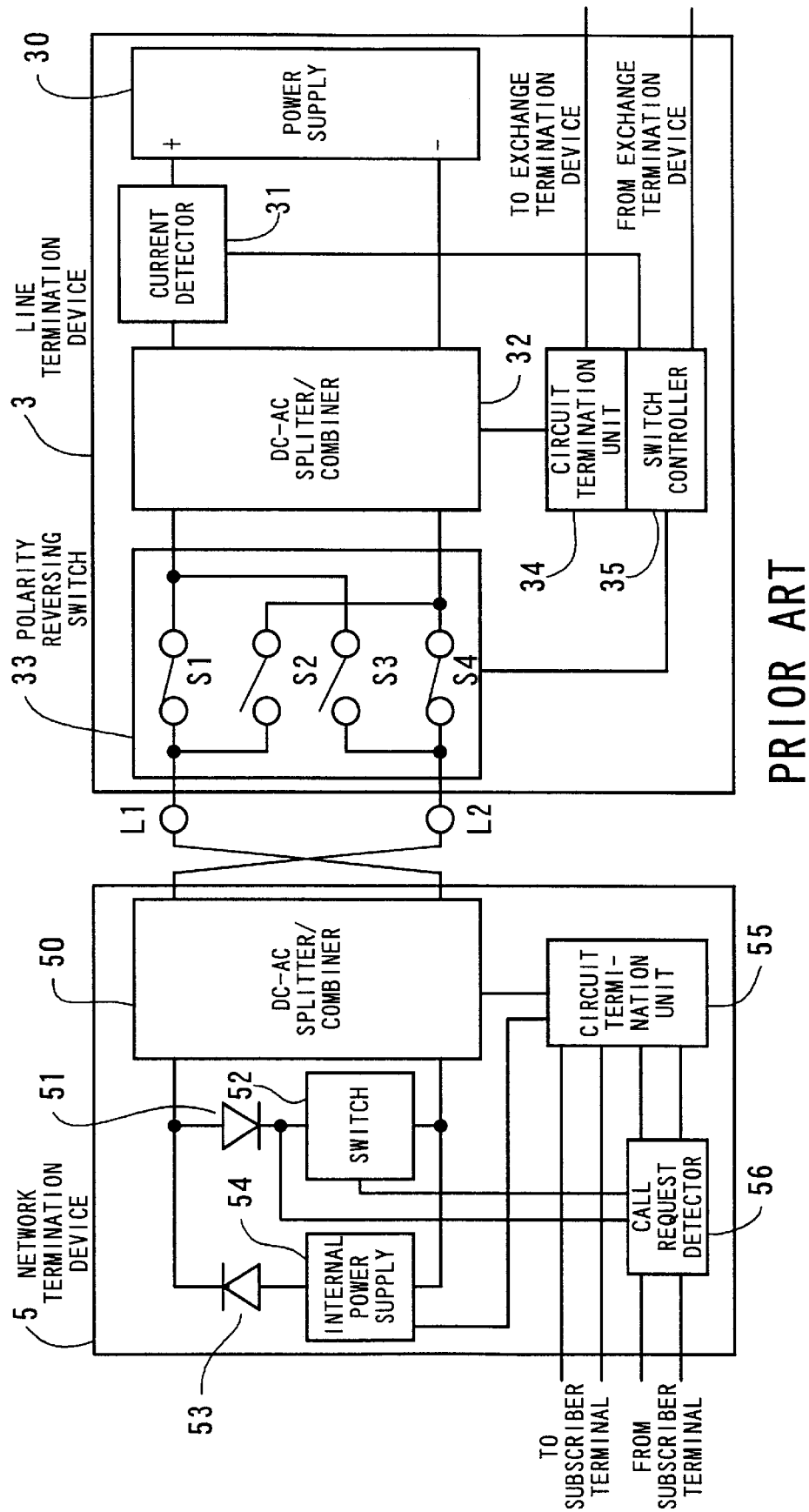
FIG. 23 is a block diagram which shows a situation where the line termination device and network termination device 5 shown in FIG. 18 are connected in a twisted manner.

FIG. 3 illustrates in detail the current detector 31 shown in FIG. 2. The current detector 31 comprises: two diodes 31a and 31b, two resistors 31c and 31d, and a photocoupler 31e. The diodes 31a and 31b, connected in series, provide a main path for the output current of the power supply 30. The resistor 31c acts as a voltage divider that determines the threshold level shown in FIG. 20, at which the photo coupler 31e is turned on and a predetermined voltage (+5 volts in this case) appears at its emitter terminal accordingly. This output voltage is applied to the resistor 31d, which serves as a load of the photo coupler 31e.

Figure 4:
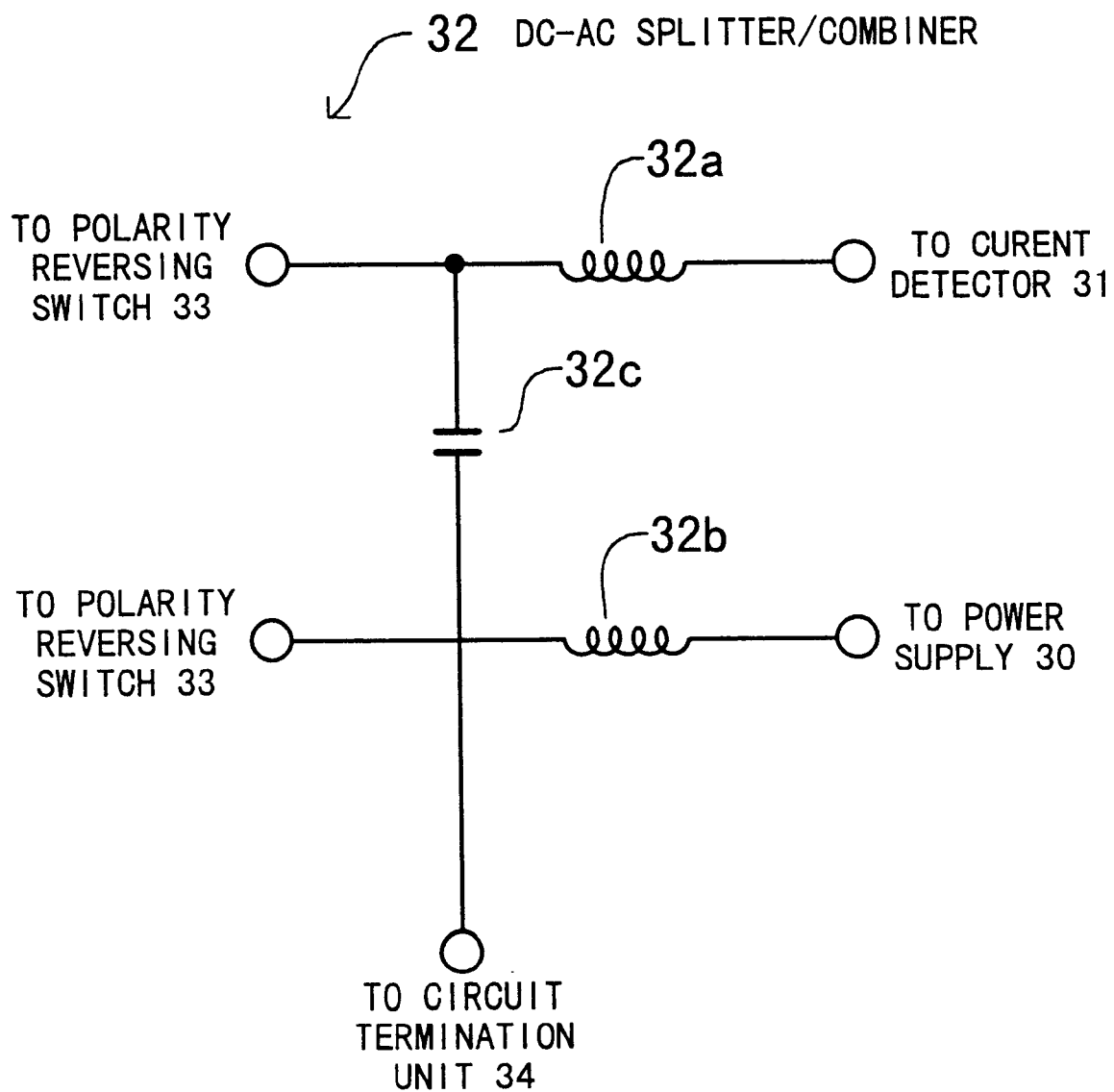
FIG. 4 is a schematic circuit diagram which shows the details of a DC-AC splitter/combiner shown in FIG. 2.

FIG. 4 is a schematic circuit diagram which shows the details of the DC-AC splitter/combiner 32 shown in FIG. 1. The DC-AC splitter/combiner 50 shown in FIG. 2 has like internal structure. As can be seen from FIG. 4, the DC-AC splitter/combiner 32 is a network comprising two inductors 32a and 32b and a capacitor 32c. Since the inductors 32a and 32b exhibit low impedance, the DC component of the supply current will appear, without attenuation, at the port near to the polarity reversing switch 33. The inductors 32a and 32b, on the other hand, have too high impedances for data signals to flow into the power supply 30. Therefore, the circuit termination unit 34 can send and receive data signals to/from the network termination device 5a, without concerning their leakage to the power supply 30.

Figure 5:
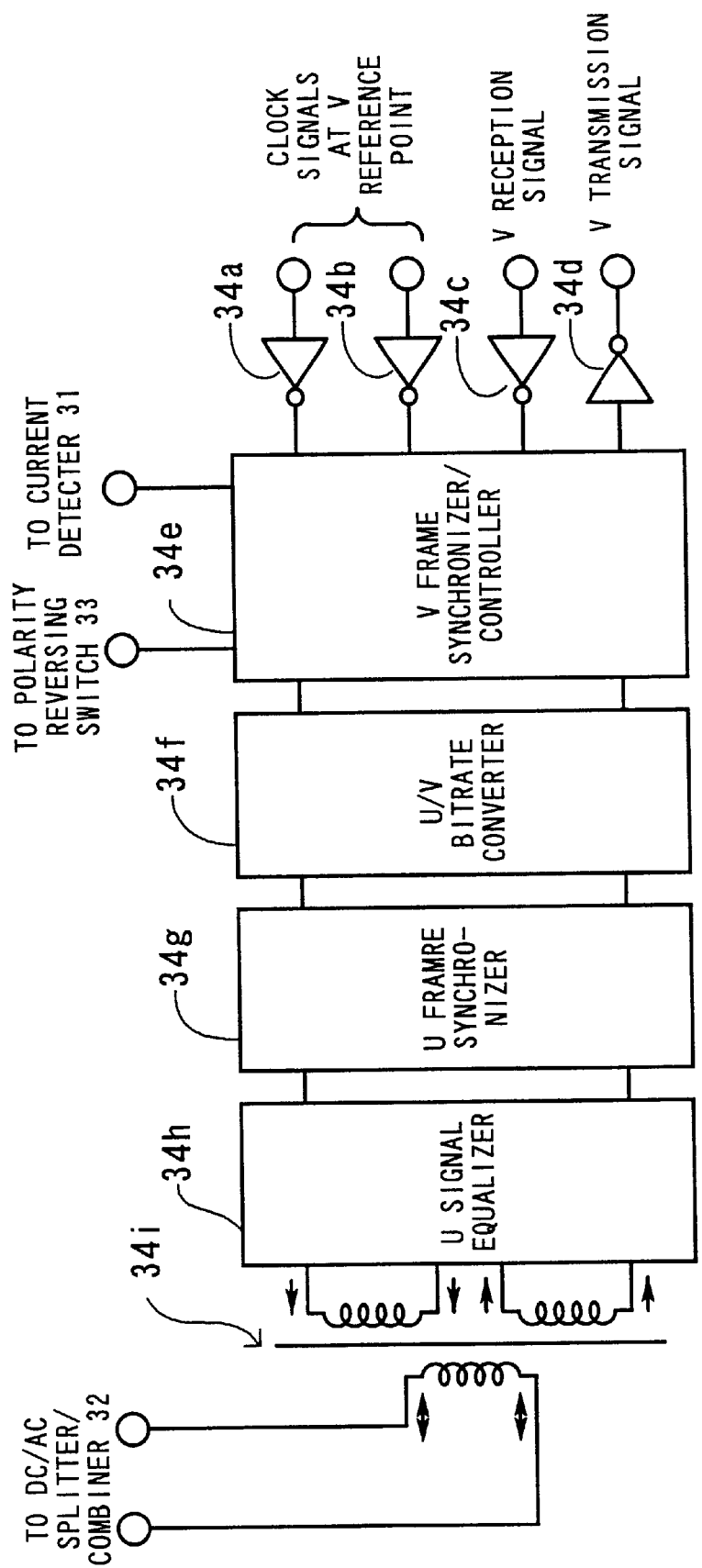
FIG. 5 is a block diagram which shows the details of a circuit termination unit and a switch controller shown in FIG. 2.

FIG. 5 is a block diagram which shows the details of the circuit termination unit 34 and the switch controller 35 shown in FIG. 2. The circuit termination unit 34 and switch controller 35 comprise: inverters 34a to 34d, a V frame synchronizer/controller 34e, a U/V bitrate converter 34f, a U frame synchronizer 34g, a U signal equalizer 34h, and an input/output transformers 34i.

The inverters 34a and 34b supply the V frame synchronizer/controller 34e with some clock timings at the V reference point, after inverting their signal levels. The inverter 34c supplies the V frame synchronizer/controller 34e with a V reception signal, after inverting its signal levels. The inverter 34d inverts the output signal of the V frame synchronizer/controller 34e, and outputs the resultant signal as a V transmission signal. Receiving a serial V interface signal, the V frame synchronizer/controller 34e executes a process to identify relevant package signals out of the received signal stream by using a channel clock signal to locate V frames. It also controls the network termination device 5a according to commands received from the V reference point.

The ISDN basic-rate services provide each subscriber with two 64-kbps user information channels (B) and one 16-kbps control channel (D), which are often called the "2B+D" service. At the U reference point, this 2B+D service actually requires a total transmission rate of 320 kbps in the case of time-compression multiplexing, for example. A plurality of U interface signals are then consolidated into faster V interface signals (4 Mbps). The U/V bitrate converter 34f performs conversion of bitrates and frame formats between such U interface signals and V interface signals. The U frame synchronizer 34g identifies and extracts every 38-bit frame from a U interface bitstream, thus performing frame synchronization. The detailed specification of this circuit is defined in the Recommendation G.961, "Digital Transmission System on Metallic Local Lines for ISDN Basic Rate Access," published by the International Telecommunication Union-Telecommunication Standardization Sector (ITU-T).

In general, data signals sent from remote peer systems are degraded due to the transmission loss and other distorting effects. The U signal equalizer 34h compensates for such signal degradation by using waveform shaping techniques suitable for the characteristics of each transmission line, as well as applying echo cancellation algorithms. The input/output transformer 34i provides inductive coupling between the DC-AC splitter/combiner 32 and the circuit termination unit 34, allowing them to transmit and receive data signals without concerning the difference in their DC potentials.

Figure 6:
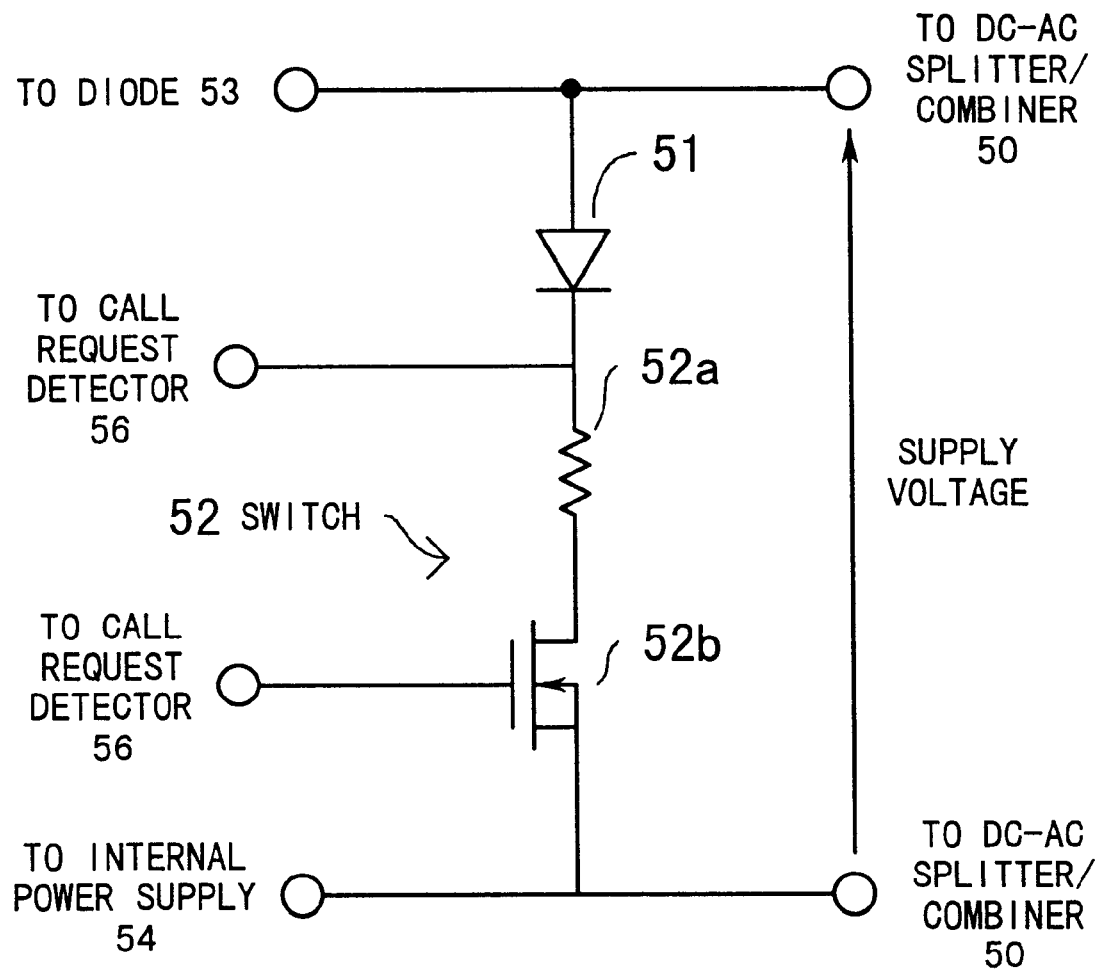
FIG. 6 is a schematic circuit diagram which shows the details of a switch shown in FIG. 1.

FIG. 6 is a schematic circuit diagram which shows the details of the diode 51 and switch 52 shown in FIG. 1. The diode 51 protects a semiconductor switch 52b from being applied a voltage in reverse supply mode. The anode of the diode 51 is connected to a series regulator 56a of the call request detector 56, which will be described later in FIG. 7, so that the supply voltage will be fed to the call request detector 56 when it is of normal polarity. Under some conditions, the resistor 52a serves as a resistive load of the supply voltage, the resistance of which is determined in according to with a prescribed loop current specification. The semiconductor switch 52b is an N-channel MOS transistor switch controlled by the call request detector 56.

Figure 7:
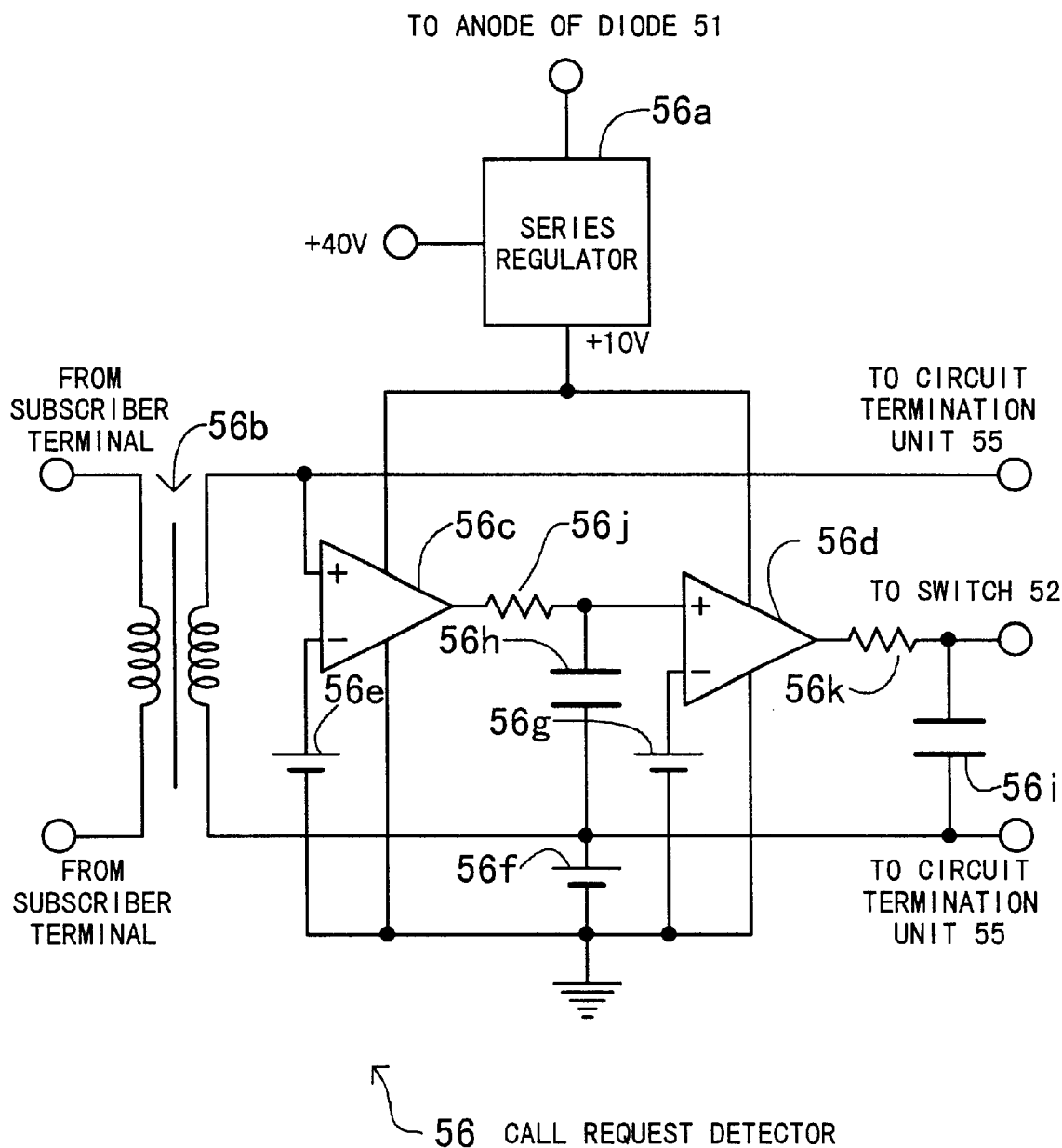
FIG. 7 is a schematic circuit diagram which shows the details of a call request detector shown in FIG. 1.

FIG. 7 is a schematic circuit diagram which shows the details of the call request detector 56 shown in FIG. 1. This call request detector 56 comprises: a series regulator 56a, an input transformer 56b, two comparators 56c and 56d, three reference voltage sources 56e to 56g, two capacitors 56h and 56i, and two resistors 56j and 56k.

In normal supply mode, the series regulator 56a produces a regulated voltage of +10 volts from the supply voltage provided through the diode 51 (FIG. 6), which energizes two comparators 56c and 56d, etc. It also produces another regulated voltage of +40 volts to drive other blocks in the network termination device 5a. Besides achieving an impedance match, the input transformer 56b prevents the DC component of an incoming telephone signal from affecting the circuit. The signal voltage developed across the secondary winding of the input transformer 56b is given to the non-inverting input terminal of the comparator 56c. Since two reference voltage sources 56e and 56f produce different reference voltages of 1.2 volts and 1.0 volts, respectively, the comparator 56c detects a signal voltage exceeding 0.2 volts, producing a predetermined output voltage. The resistor 56j and capacitor 56h, forming a first RC filter, smooth out the output of the comparator 56c. The smoothed output signal is then applied to the non-inverting input terminal of another comparator 56d. Because the reference voltage sources 56f and 56g produce different reference voltages of 1.0 volts and 1.2 volts, respectively, the second comparator 56d detects a non-inverting input voltage exceeding 0.2 volts, producing a predetermined output voltage. The resistor 56k and capacitor 56i form a second RC filter to smooth out the output of the comparator 56d, as in the first RC filter of the resistor 56j and capacitor 56h. The smoothed output signal is used to drive the aforementioned semiconductor switch 52b (FIG. 6), so that a call request signal from a subscriber terminal will turn on the switch 52 (FIG. 1).

Figure 8:
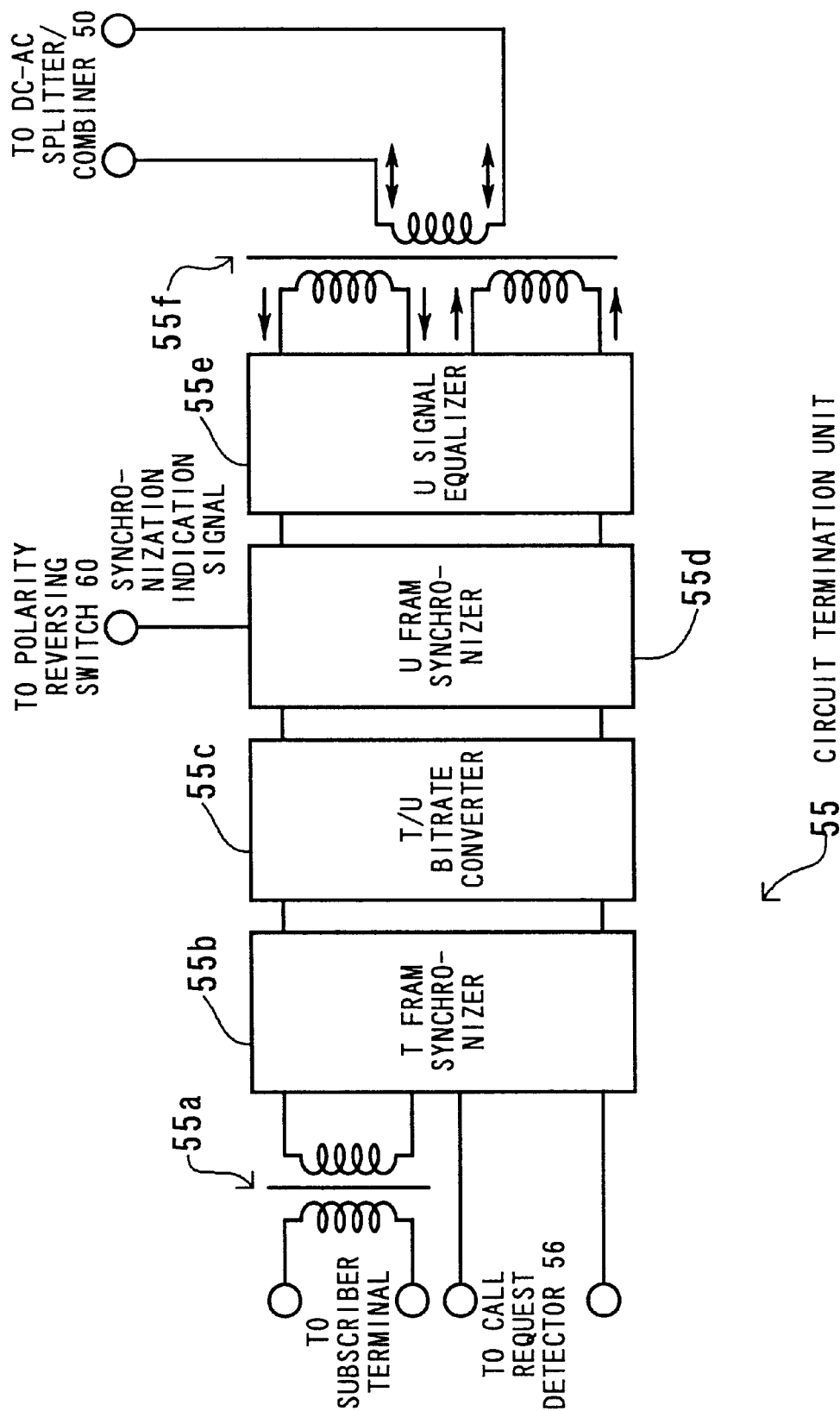
FIG. 8 is a block diagram which shows the details of a circuit termination unit shown in FIG. 1.

FIG. 8 is a block diagram which shows the details of the circuit termination unit 55 shown in FIG. 1. This circuit termination unit 55 comprises: an output transformer 55a, a T frame synchronizer 55b, a T/U bitrate converter 55c, a U frame synchronizer 55d, a U signal equalizer 55e, and an input/output transformer 55f.

Besides serving as an impedance matching transformer, the output transformer 55a transfers the output signal of the T frame synchronizer 55b toward subscriber terminals. The T frame synchronizer 55b identifies and extracts every frame from the T interface bitstream to perform frame synchronization. The T/U bitrate converter 55c performs bitrate and frame format conversion between U interface (320 kbps) and T interface (192 kbps) to transport data signals for 2B+D basic-rate access. The U frame synchronizer 55d identifies and extracts every 38-bit frame from the U interface bitstream to accomplish frame synchronization, producing a signal to indicate the establishment of synchronization to the polarity switch controller 70. The ITU-T Recommendation G.961 defines the detailed specification of this circuit.

The U signal equalizer 55e is coupled to the DC-AC splitter/combiner 50 through the input/output transformer 55f, to transmit and receive data signals to/from a remote peer system (i.e., the line termination device 3). To compensate for signal degradation due to the transmission loss and other factors, the U signal equalizer 55e reshapes the waveform according to the characteristics of transmission lines, as well as applying appropriate echo cancellation techniques. The input/output transformer 55f provides inductive coupling between the DC-AC splitter/combiner 50 and the circuit termination unit 34, allowing them to exchange data signals without concerning the difference in their DC potentials.

Figure 9:
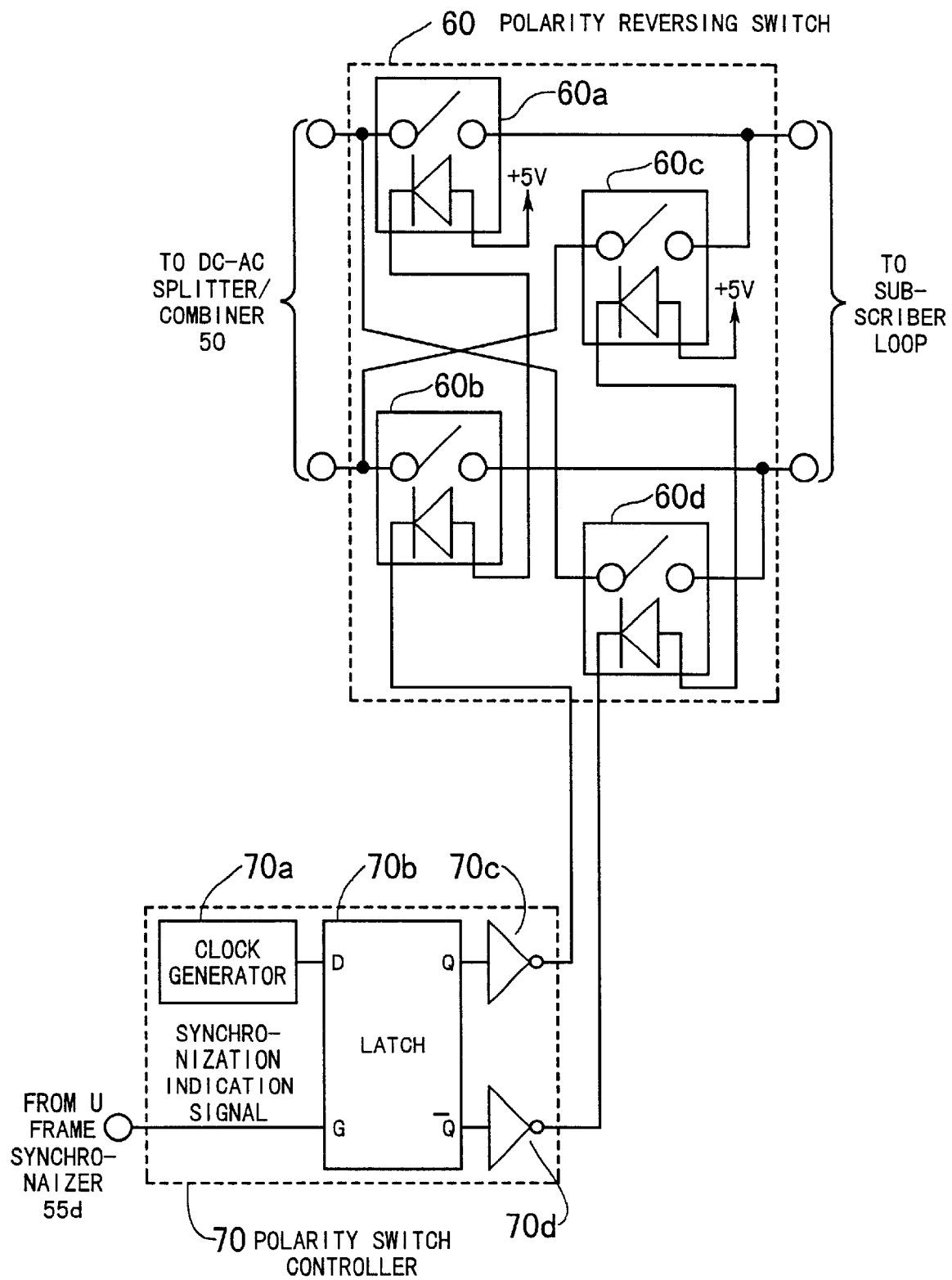
FIG. 9 is a schematic circuit diagram which shows the details of a polarity switch controller and a polarity reversing switch shown in FIG. 1.

FIG. 9 is a schematic circuit diagram of the polarity reversing switch 60 and polarity switch controller 70 shown in FIG. 1. The polarity reversing switch 60 comprises four optically-isolated solid-state relays, or photoMOS relays, 60a to 60d, which change over the polarity of subscriber loop connection under the control of the polarity switch controller 70. More specifically, the polarity reversing switch 60 forms a straight connection path when the relays 60a and 60b are turned on. It provides in turn a reverse connection path when the relays 60c and 60d are closed.

On the other hand, the polarity switch controller 70 comprises: a clock generator 70a, a latch 70b, and two inverting buffers 70c and 70d. Recall here that the line termination device 3 would oscillate between normal supply mode and reverse supply mode when it is wired incorrectly to the network termination device 5a. The clock generator 70a produces a clock signal with a cycle time τ that is longer than the interval of that oscillation. The cycle time τ may be 300 ms, for example. The latch 70b is designed to hold the state of the clock signal when the synchronization indication signal is asserted, or driven to a high level, while it appears to be transparent when the synchronization indication signal is low. The latch 70b has a non-inverting and inverting outputs, both of which are used to drive the polarity reversing switch 60, being buffered by the inverting buffers 70c and 70d.

At fixed intervals of τ according to the clock signal oscillation, the polarity reversing switch 60 repetitively changes the connection path, between normal and reverse, until the frame synchronization is achieved. At the moment when the synchronization indication signal becomes active, the polarity switch controller 70 holds its outputs, causing the polarity reversing switch 60 to stop changing and maintain the current connection path, no matter what polarity it is. Suppose, for example, that the clock signal was high at the instant of synchronization indication signal transition. The Q output terminal then goes high, and the output of the inverting buffer 70c goes low. This turns on the photoMOS relays 60a and 60b, making the polarity reversing switch 60 form a normal connection path.

Referring next to a timing diagram of FIG. 10, the operation of the first embodiment will be described below.

Figure 24:
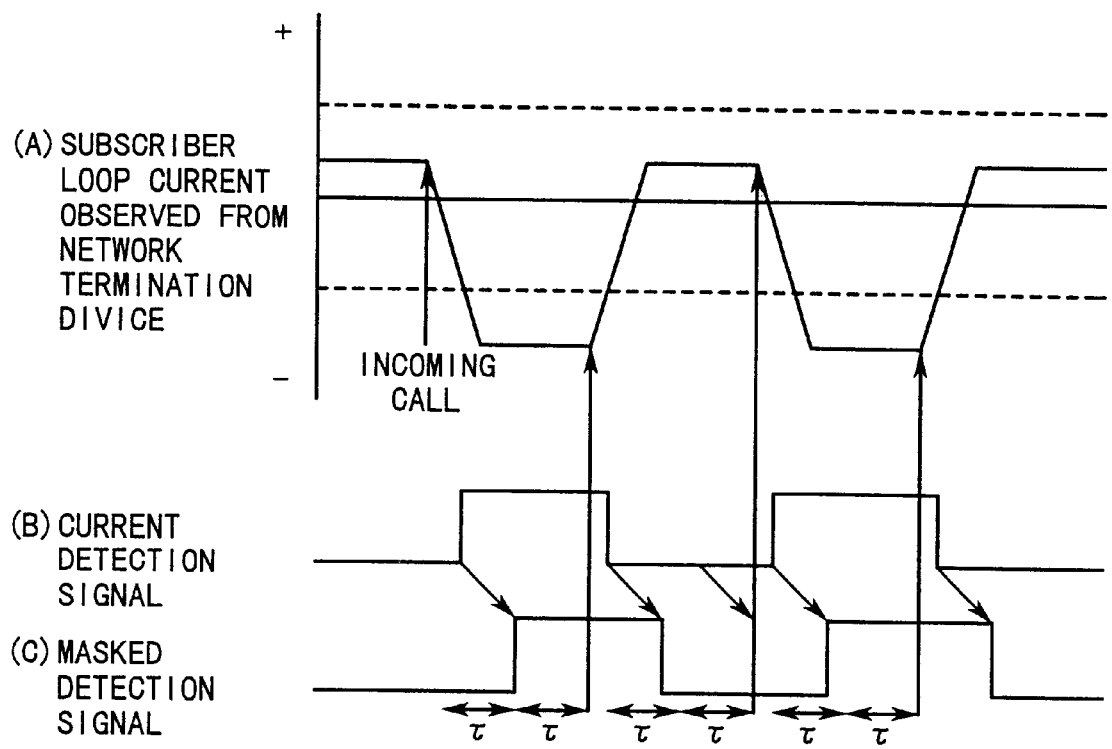
FIG. 24 is a timing diagram which explains how the conventional system would operate in the situation depicted in FIG. 23.

It is assumed here that the network termination device 5a and line termination device 3 are connected in reverse polarity as shown in FIG. 1. It is further assumed that the clock signal generated by the clock generator 70a exhibits a high level at the moment when the reverse connection is made. Under such a condition, the polarity switch controller 70 directs the polarity reversing switch 60 to activate the relays 60a and 60b to form a normal, straight connection path. This produces a situation where the network termination device 5a is eventually supplied with a reverse supply voltage. Now that the network termination device 5a has entered such a virtual reverse supply mode, the line termination device 3 begins to oscillate at specific intervals, supplying alternately a normal voltage and a reverse voltage as explained earlier in FIG. 24.

Figure 10:
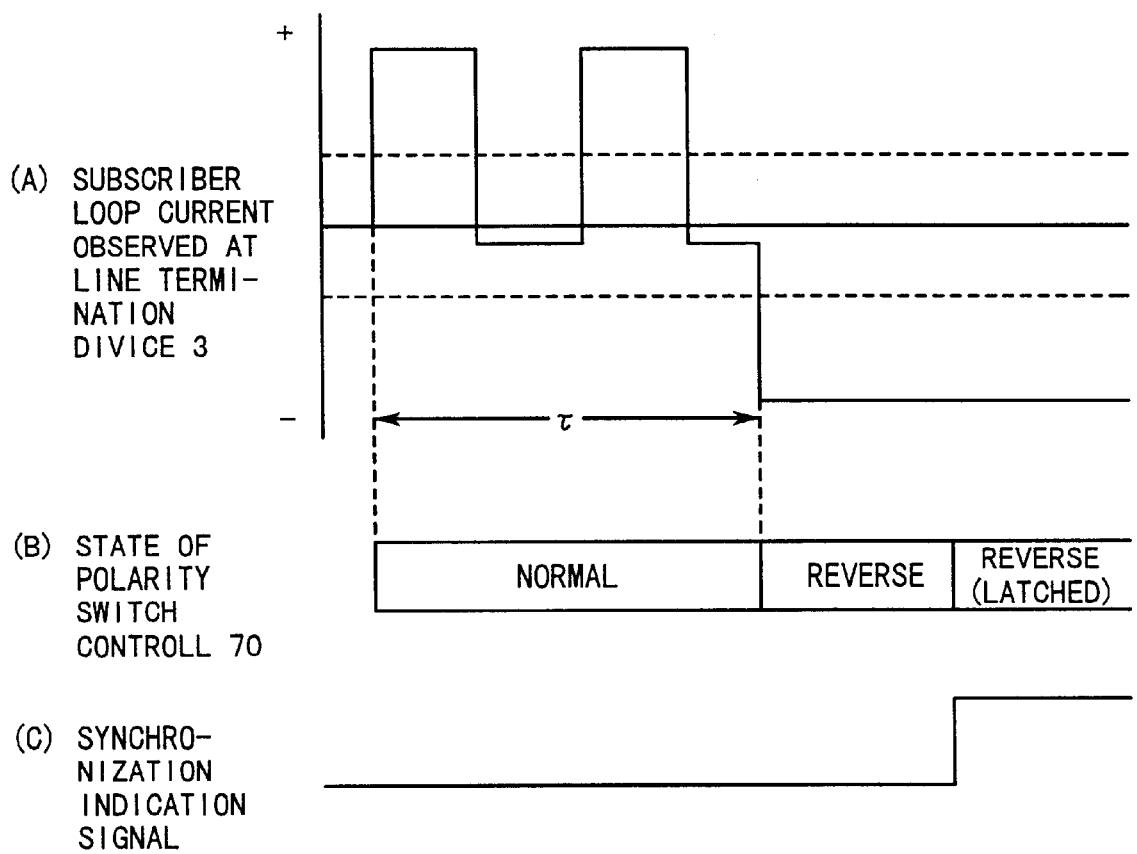
FIG. 10 is a timing diagram which explains how the network termination device of the first embodiment will work if it is connected reversely to the line termination device.

As depicted in (A) of FIG. 10, the oscillation continues until the predetermined cycle time τ has elapsed. At the high-to-low transition of the clock signal, the polarity reversing switch 60 changes its internal connection path from "normal" to "reverse" as shown in (B) of FIG. 10. If the line termination device 3 was supplying a reverse voltage (i.e., the polarity reversing switch 33 was providing a reverse connection) at that time, then the network termination device 5 begins to receive the reverse voltage as it is. The internal power supply 54 now consumes the supplied power, permitting the current detector 31 in the line termination device 3 to detect the load current. Accordingly, the switch controller 35 commands the polarity reversing switch 33 to keep the reverse supply. Since the reverse voltage is stable, the internal power supply 54 begins to operate, which will energize and initialize the circuit termination unit 55. Shortly, the line termination device 3 and network termination device 5 establish synchronization, enabling the U frame synchronizer 55d in the circuit termination unit 55 to assert the synchronization indication signal. This synchronization indication signal causes the latch 70b to hold the clock signal at that moment, and thus the polarity reversing switch 60 keeps the reverse connection path.

In the way described above, the proposed network termination device 5a employs the polarity reversing switch 60 and polarity switch controller 70 to restore the correct polarity of connection, even if the physical wiring is reversed. This feature of the present invention eliminates the need to check the polarity of an existing subscriber loop, thus making it easy to install network termination devices.

The above example has demonstrated that the network termination device 5a operates correctly with the line termination device 3 that is connected reversely. The proposed device 5a, of course, will work fine with a normal, straight connection. When both the subscriber loop and polarity reversing switch 60 are of normal polarity, the network termination device 5 operates in normal supply mode, and thus the line termination device 3 does not change its output. However, the clock generator 70a in the polarity switch controller 70 causes the polarity reversing switch 60 to reverse the polarity after the predetermined time τ has expired, since the synchronization indication signal stays inactive. This results in a reverse voltage applied to the network termination device 5, which triggers the oscillation of the supply voltage on the side of the line termination device 3. This situation would continue until the polarity reversing switch 60 returns from reverse to normal while the line termination device 3 is in reverse supply mode. When this condition is met, the synchronization indication signal is asserted and the polarity reversing switch 60 falls into the hold mode, as in the case of FIG. 10.

Figure 11:
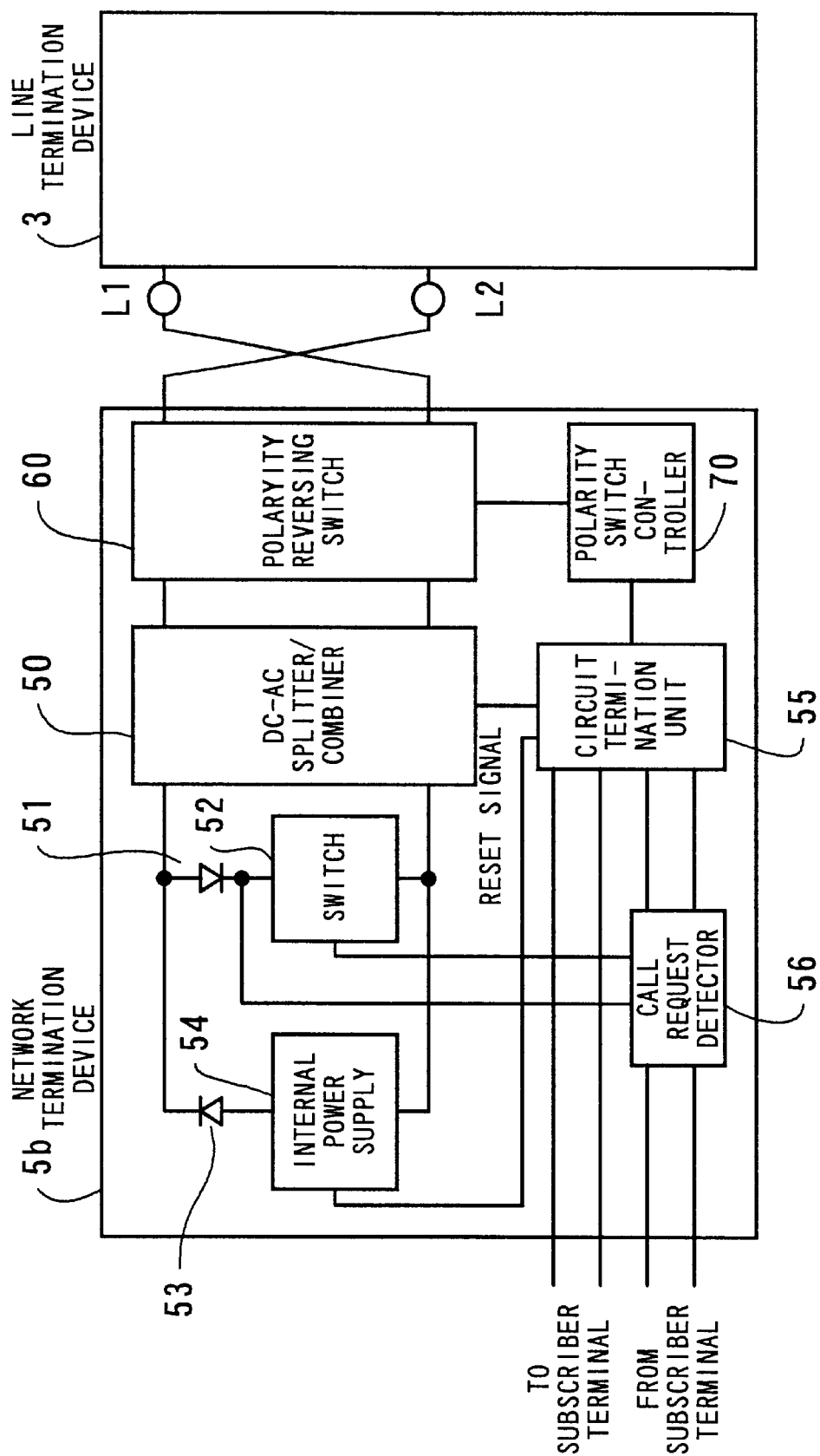
FIG. 11 is a block diagram which shows a network termination device according to a second embodiment of the present invention.

Referring next to FIG. 11, a second embodiment of the present invention will be described below. Since this second embodiment shares many common elements with the first embodiment described earlier in FIG. 1, the following section will focus on its distinctive elements, while affixing like reference numerals to like elements.

FIG. 11 shows a network termination device 5b according to the second embodiment, which differs from the first embodiment in that a reset signal is supplied from the internal power supply 54 to the circuit termination unit 55. It should also be noted that the proposed network termination device 5b takes power from a commercial AC line of 110 volts, with an appropriate power supply circuit (not shown in FIG. 11) to reduce and rectify line voltage. This use of AC power supply makes a good contrast with the conventional network termination device 5 described earlier in FIG. 19, which is energized by the remote line termination device 3. Recall that, in the latter device, the circuit termination unit 55 has a power-on reset function to initialize itself upon power-up. As opposed to this conventional scheme, the circuit termination unit 55 in the proposed device 5c (FIG. 11) is always energized by the local power source. This system, however, has the following disadvantage. That is, changing the polarity of a supply voltage may produce some unstable transitional period, which leads to noise interference within the network termination device 5. Since the network termination device 5 are always energized, the noise signals can easily propagate to subscriber terminals via the circuit termination unit 55.

To solve the above problem, the second embodiment of the present invention shown in FIG. 11 proposes to reset the circuit termination unit 55 when the line termination device 3 has changed its mode from normal to reverse, or vise versa. For this purpose, the internal power supply 54 produces a reset signal when a predetermined time has elapsed after each transition of the supply mode. It is expected that the provision of this reset signal will keep the subscriber terminals isolated from any undesired noise produced in the line termination device 3 or network termination device 5b.

Figure 12:
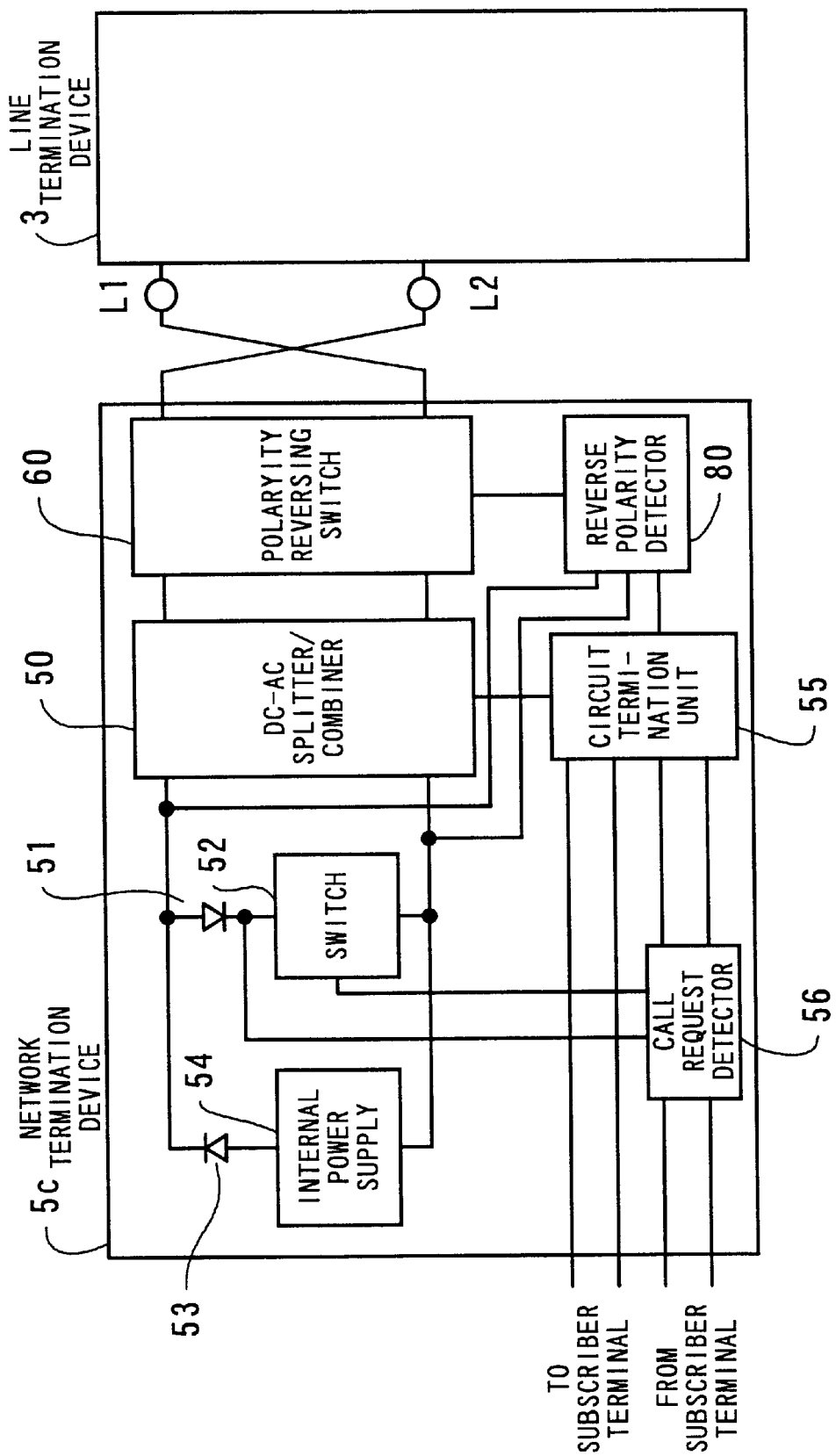
FIG. 12 is a block diagram of a network termination device according to a third embodiment of the present invention.

Referring next to FIG. 12, a third embodiment of the present invention will be described below.

FIG. 12 is a block diagram of a network termination device 5c according to the third embodiment of the present invention. Since this third embodiment shares many common elements with the first embodiment described earlier in FIG. 1, the following section will focus on its distinctive elements, while affixing like reference numerals to like elements. The third embodiment differs from the first embodiment in that a reverse polarity detector 80 is employed in place of the polarity switch controller 70, while the other elements are exactly the same as those shown in FIG. 1.

Figure 13:
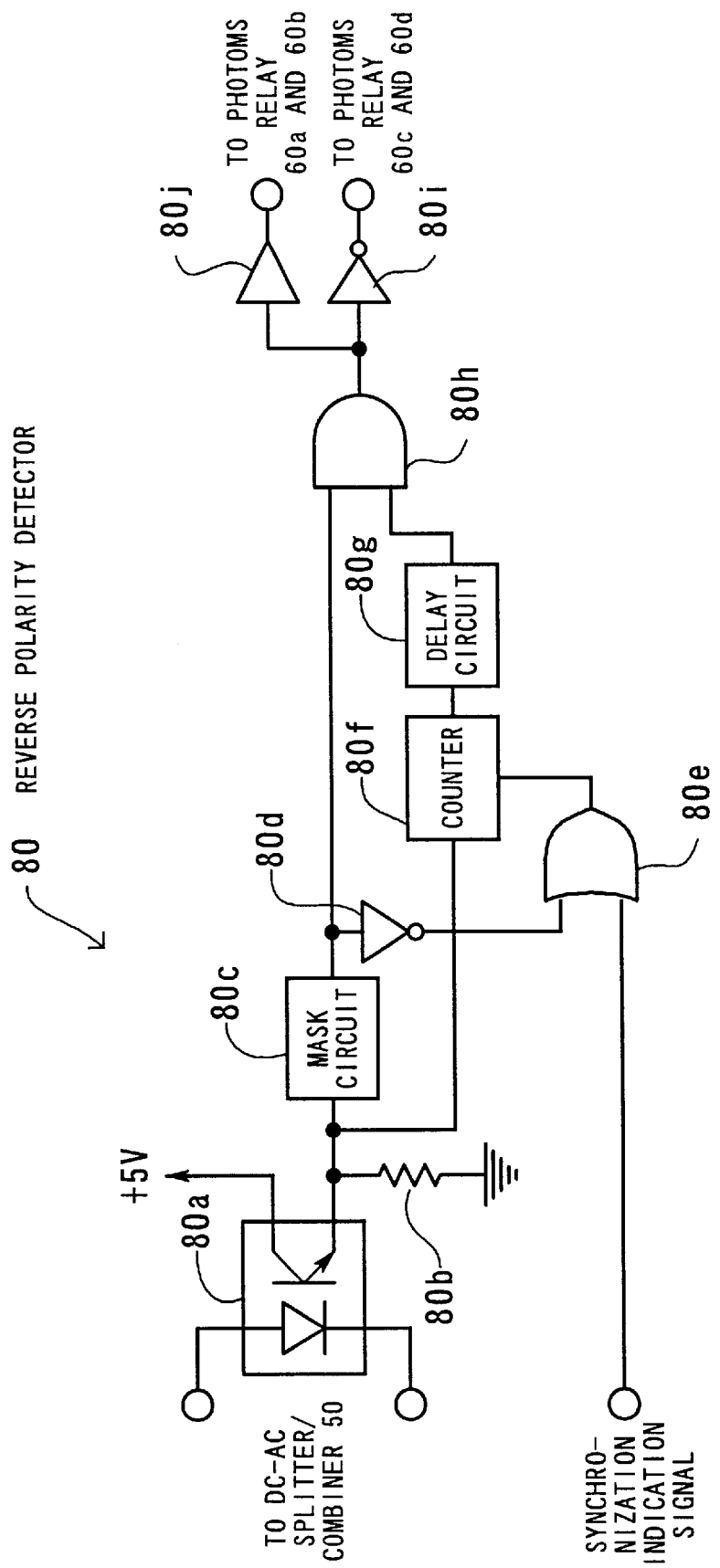
FIG. 13 is a schematic circuit diagram which shows the details of a reverse polarity detector shown in FIG. 12.

FIG. 13 is a schematic circuit diagram which shows the details of the reverse polarity detector 80 shown in FIG. 12. This reverse polarity detector 80 comprises: a photocoupler 80a, a resistor 80b, a mask circuit 80c, an inverter 80d, a logical OR gate 80e, a counter 80f, a delay circuit 80g, a logical AND gate 80h, an inverting buffer 80i, and a non-inverting buffer 80j.

The photocoupler 80a, connected to the DC-side port of the DC-AC splitter/combiner 50, causes a predetermined voltage across its load resistor 80b, when a normal supply voltage is present at that port. The mask circuit 80c outputs a high level at the rising edge of the output of the photocoupler 80a. It maintains this high-level output for a predetermined period $\tau_1$ even after the photocoupler 80a is turned off. This signal is referred to as the "mask signal." The inverter 80d supplies the logical OR gate 80e with an inverted mask signal.

The logical OR gate 80e performs a logical sum operation between the output signal of the inverter 80d and the synchronization signal, and resets the counter 80f according to the result of the operation. More specifically, the counter 80f is initialized to zero at the rising edge of the synchronization signal, or at the falling edge of the mask signal. Counting every low-to-high transition of the output signal of the photocoupler 80a, the counter 80f asserts an active-high signal when the count value has reached a predetermined value. This signal is referred to as the "terminal count signal," and the critical value is assumed to be three in this specific example of FIG. 13.

The delay circuit 80g adds a predetermined time delay of d to the terminal count signal of the counter 80f. Preferably, the delay time d is about three quarters of the cycle time of the oscillation which could occur when the line termination device 3 and network termination device 5 are connected reversely. The logical AND gate 80h performs a logical product operation between the delayed terminal count signal and the mask signal. The resultant signal is supplied to the inverting buffer 80i and non-inverting buffer 80j to drive the polarity reversing switch 60. Being connected to the photoMOS relays 60a and 60b, the non-inverting buffer 80j causes the polarity reversing switch 60 to provide a straight connection path when the output of the logical AND gate 80h is low. The inverting buffer 80i, connected to the photoMOS relays 60c 60d, causes the polarity reversing switch 60 to provide a reverse connection path when the output of the logical AND gate 80h is high.

Figure 14:
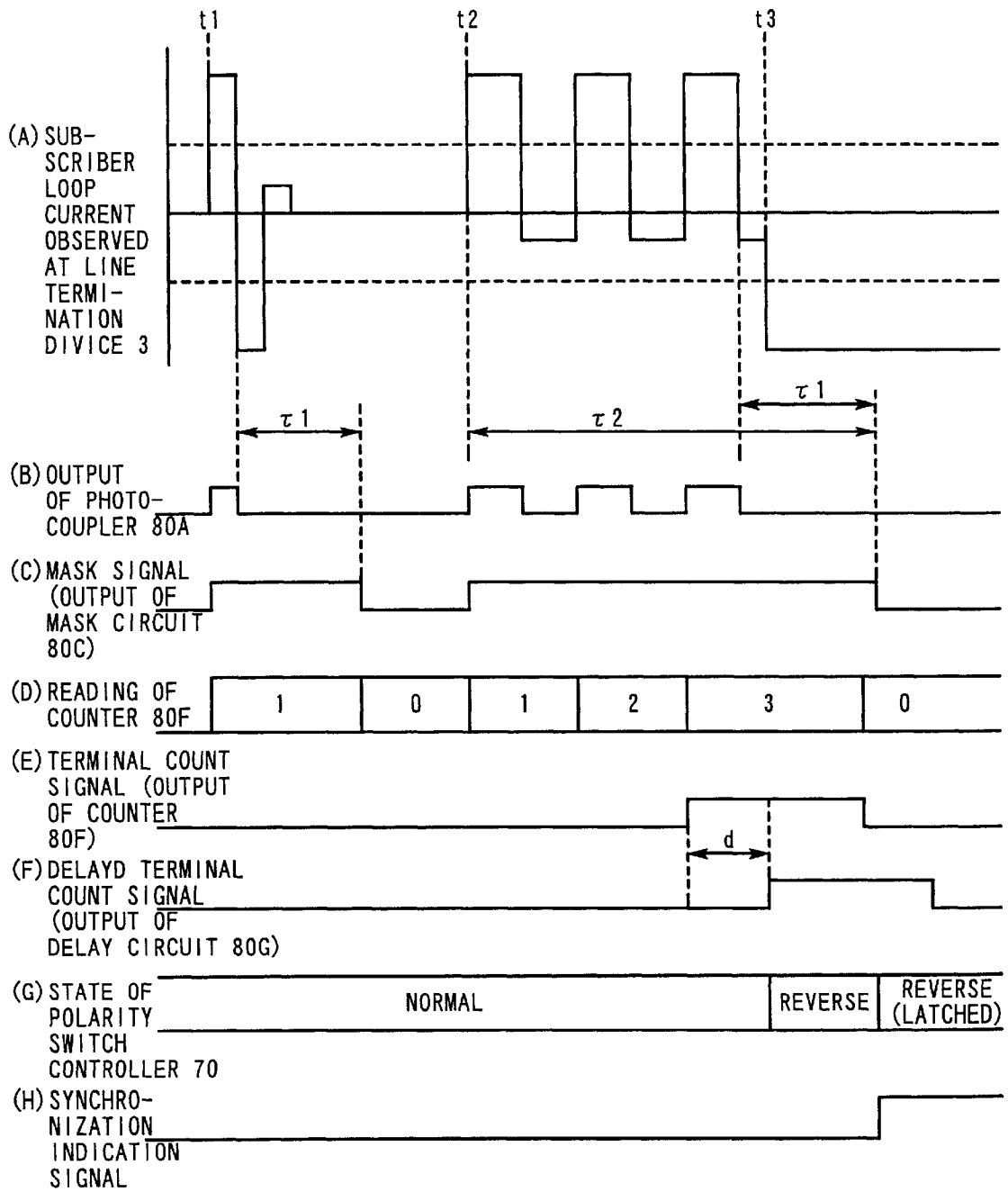
FIG. 14 is a timing diagram which explains how the network termination device of the third embodiment will work if it is connected reversely to the line termination device.

Referring next to FIG. 14, the operation of the third embodiment of the present invention will be described below.

It is assumed here that the network termination device 5a and line termination device 3 are connected in reverse polarity. Because the outputs of the delay circuit 80g and mask circuit 80c are both low at the initial stage, the logical AND gate 80h produces a low-level signal, making the output of the non-inverting buffer 80j low. Accordingly, the polarity reversing switch 60 provides a normal connection path.

Suppose here that some noise interference has happened to the network termination device 5 at time t1 as shown in (A) of FIG. 14. The positive noise current turns on the photocoupler 80a, resulting in a positive pulse (B) appearing at its output terminal for the duration of the interference. At the rising edge of this pulse signal, the counter 80f is incremented by one. Assuming that the counter 80f was initialized to zero before the noise interference happens, its current reading (D) is "one" as shown in FIG. 14. On the other hand, the mask circuit 80c asserts the mask signal (C), being triggered by the output signal of the photocoupler 80a. The mask circuit 80c holds this high-level signal for the duration of $\tau_1$ after the triggering signal is removed. The noise interference ceases soon and the photocoupler 80a becomes inactive accordingly. The counter 80f is therefore cleared at the falling edge of the mask signal (D).

At time t2, the line termination device 3 begins to oscillate between normal supply mode and reverse supply mode at specific intervals, as shown in (A) of FIG. 14. The reason for this oscillation has been described earlier with reference to FIG. 24. The oscillation causes the counter 80f to see successive increases in response to each output pulse that the photocoupler 80a produces, and the rising edge of the third pulse brings about assertion of the terminal count signal (E). Notice that the mask circuit 80c maintains its high-level output state during oscillation, because the given pulse intervals are shorter than its time constant $\tau_1$.

The terminal count signal then appears at the output terminal of the delay circuit 80g, being delayed by the predetermined time d. FIG. 14 shows this signal as a delayed terminal count signal (F), which is asserted at time t3. Because the mask signal (C) remains high, the logical AND gate 80h passes the delayed terminal count signal (F) as it is, meaning that the output of the logical AND gate 80h changes from low to high at time t4. This signal transition affects the polarity reversing switch 60 via the non-inverting buffer 80j and inverting buffer 80i, switching its internal connection path (G) from normal to reverse.

The above-described process normalizes the connection between the line termination device 3 and network termination device 5c. Since the normalized connection path enables the two devices to start communication, the circuit termination unit 55 asserts the synchronization indication signal (H) as shown in FIG. 14. This synchronization indication signal (H) clears the counter 80f. The polarity reversing switch 60 keeps the reverse connection path, since the line termination device 3 stops changing the polarity of the supply voltage after that.

In the case that the line termination device 3 and network termination device 5c are connected in normal polarity, no oscillation of supply voltage occurs, and therefore, the logical AND gate 80h in the reverse polarity detector 80 holds its initial low-level state. As a result, the polarity reversing switch 60 keeps its straight connection path, allowing the line termination device 3 and network termination device 5c to communicate with each other.

The above-described example has assumed that the counter 80f is designed to output a terminal count signal when its count value reaches three. However, it is not intended to limit the invention to this specific arrangement of the counter 80f. The third embodiment of the present invention allows other values for use with the counter 80f. For example, the counter 80f can be designed to have a terminal count value of four, to ensure more reliable operations of the circuit.

The third embodiment allows further modification such that the mask circuit 80c has another time constant $\tau_2$ as shown in FIG. 14, instead of retriggering its internal timer of $\tau_1$ each time a new input pulse arrives. More specifically, the alternative mask circuit 80c will keep its high-level output, once triggered, and negate it after the predetermined time $\tau_2$ has expired, regardless of the presence of new input pulses.

Figure 15:
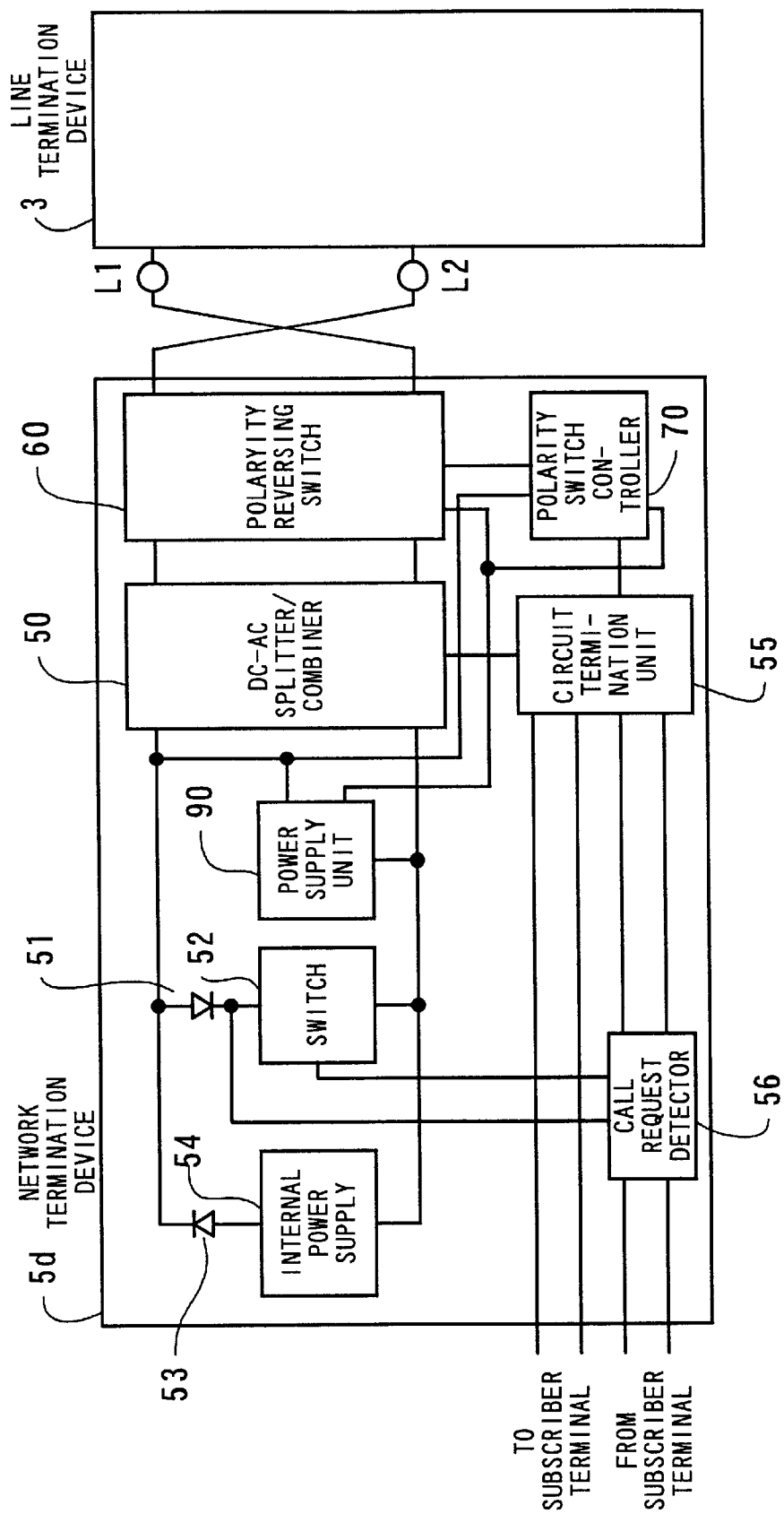
FIG. 15 is a block diagram of a network termination device according to a fourth embodiment of the present invention.

Referring next to FIG. 15, a fourth embodiment of the present invention will be described below.

FIG. 15 is a block diagram of a network termination device 5d according to the fourth embodiment of the present invention. Since this fourth embodiment shares many common elements with the first embodiment described earlier in FIG. 1, the following section will focus on its distinctive elements, affixing like reference numerals to like elements. The network termination device 5d of the fourth embodiment differs from that of the first embodiment in that a power supply unit 90 is newly added. The other elements are exactly the same as those shown in FIG. 1. The power supply unit 90 produces DC power through full-wave rectification of a supply voltage provided from its local DC-AC splitter/combiner 50. The produced DC power is fed to the polarity reversing switch 60 and polarity switch controller 70.

Figure 16:
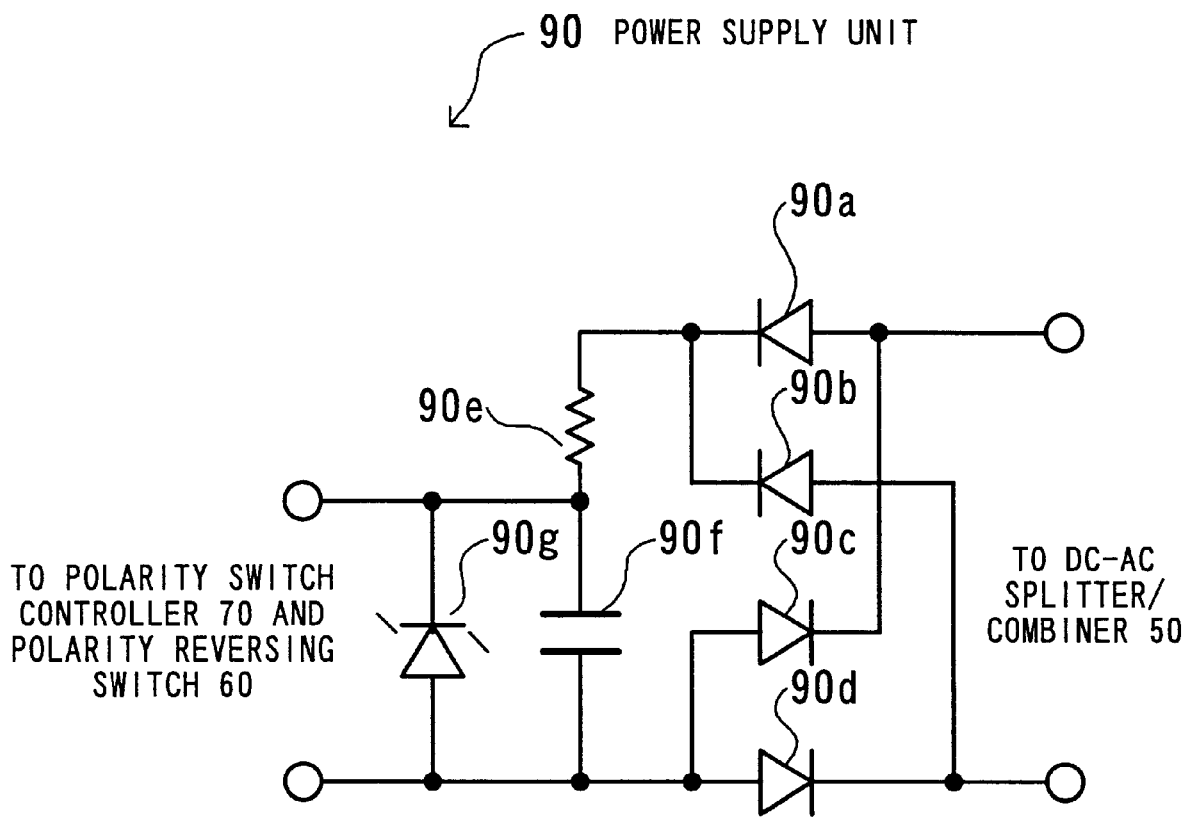
FIG. 16 is a schematic circuit diagram which shows the details of a power supply unit used in the fourth embodiment shown in FIG. 15.

FIG. 16 is a schematic circuit diagram which shows the details of the power supply unit 90 introduced in the fourth embodiment. This power supply unit 90 comprises: four diodes 90a to 90d, a resistor 90e, a capacitor 90f, and a zener diode 90g. The diodes 90a to 90d serve as a full-wave bridge that rectifies the output of the DC-AC splitter/combiner 50. The resistor 90e and capacitor 90f form a smoothing circuit to filter out ripples contained in the full-wave rectified voltage. The zener diode 90g clamps the output to a constant voltage.

The purpose of the power supply unit 90 is to provide a more reliable power source for the polarity reversing switch 60 and polarity switch controller 70, even in such an unstable situation where the line termination device 3 oscillates between normal supply mode and reverse supply mode. The fourth embodiment ensures the polarity switching operation described above.

Figure 17:
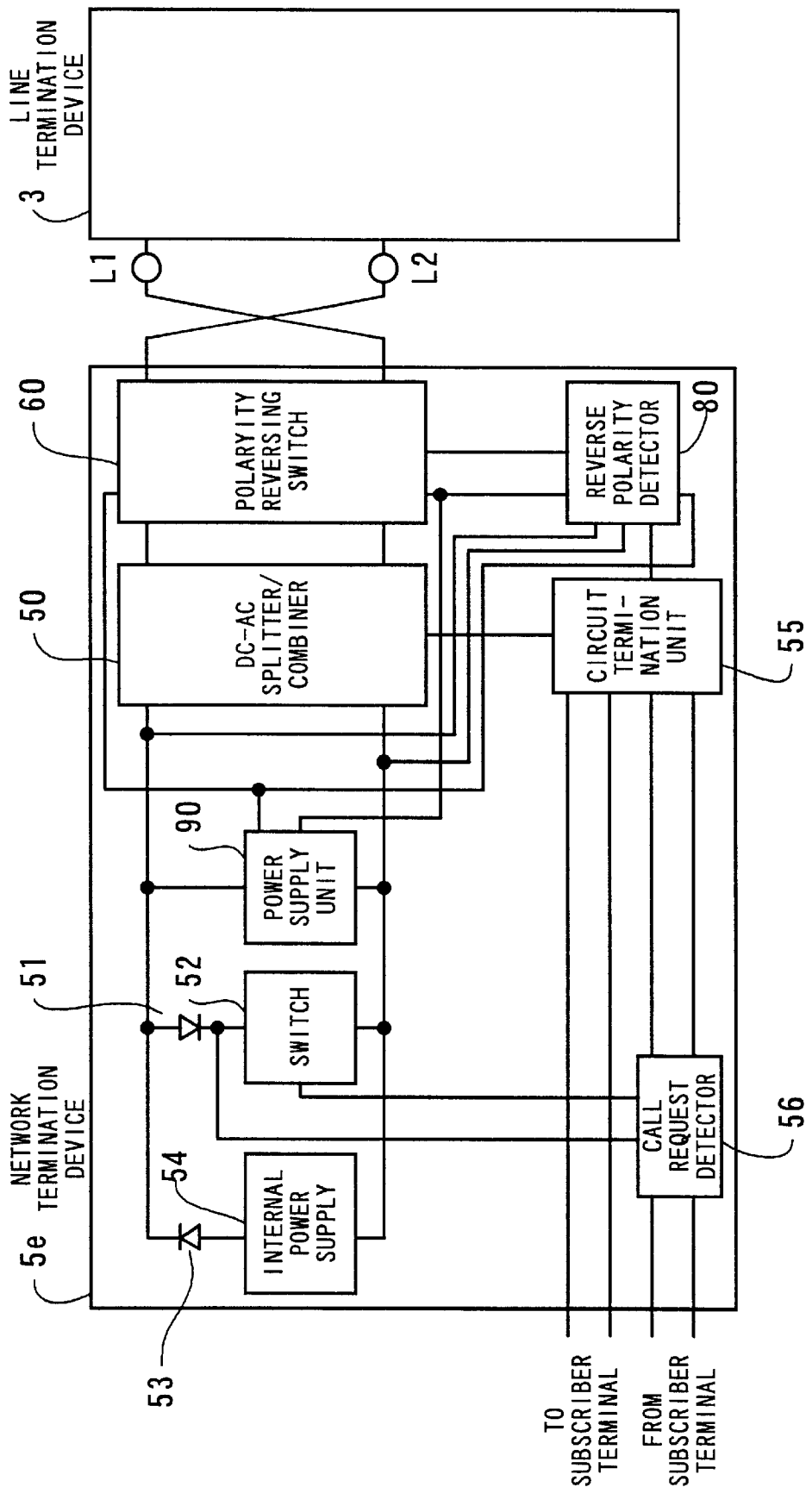
FIG. 17 is a block diagram of a network termination device according to a fifth embodiment of the present invention.
Figure 18:
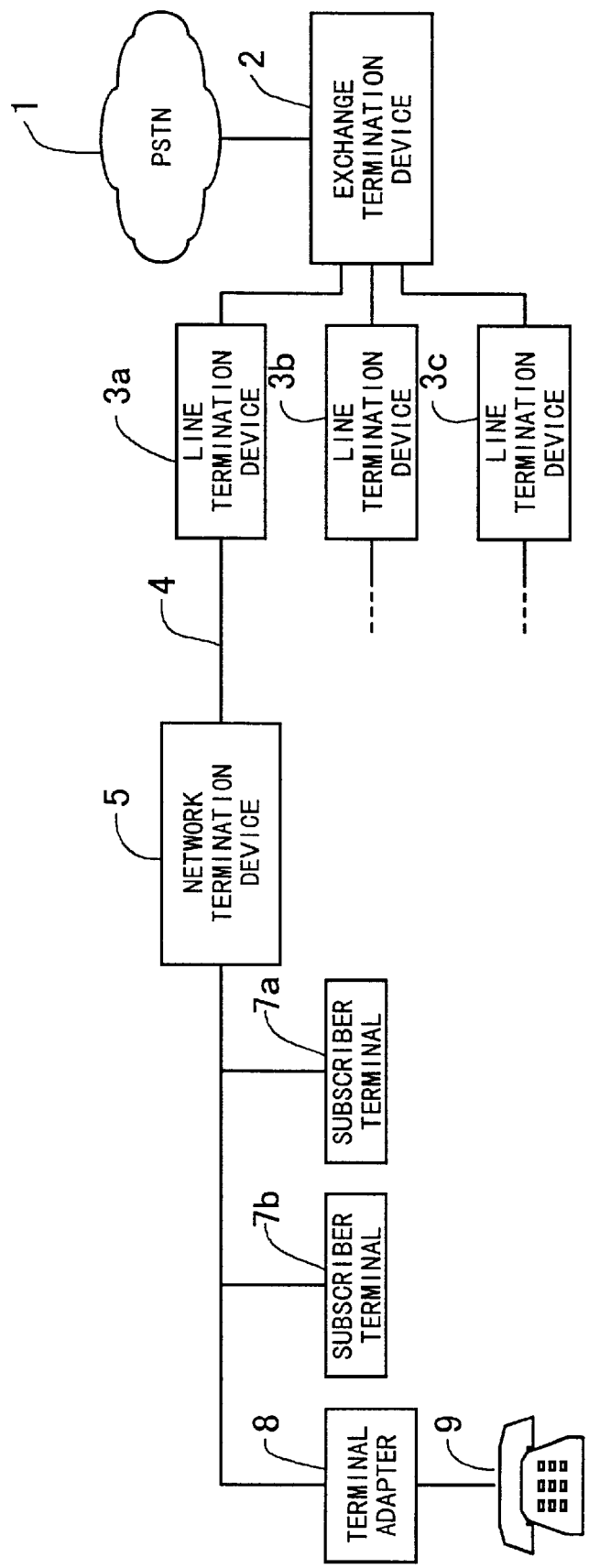
FIG. 18 is a block diagram which shows a typical telephone system based on the ISDN reference model.

The fourth embodiment may be modified in such a way that the power supply unit 90 is employed in the network termination device 5c (FIG. 12). That is, the same concept can be applied to the third embodiment, instead of the first embodiment, as illustrated in FIG. 17. Here, the power supply unit 90 provides power to the polarity reversing switch 60 and reverse polarity detector 80, while inheriting main features from the system shown in FIG. 15. Also in this implementation, a reliable power source is provided for the polarity reversing switch 60 and polarity switch controller 70, which would work fine even in such an unstable situation where the line termination device 3 oscillates between normal supply mode and reverse supply mode. This configuration of the fourth embodiment ensures the polarity switching operation described above.

The above-described embodiments use a synchronization indication signal to hold the state of the polarity reversing switch 60. However, the invention is not limited to this specific signal, but allows the use of other signals, if available. Essentially, any other signals will do for the intended operation, if they distinguishably represent a state where the line termination device 3 and network termination device 5 have established their frame synchronization.

The above discussion is now summarized as follows. Network termination devices for ISDN networks determines whether the subscriber loop is in an idle state or a busy state by testing the polarity of a supply voltage provided from a central office. According to the present invention, the network termination device is equipped with a polarity reversing switch which switches between normal polarity and reverse polarity of connection to the central office. It also comprises: a detector to detect whether the polarity of connection to the central office is normal or reverse; and a polarity switch controller to change the polarity of connection by controlling the polarity reversing switch in accordance with the detection result obtained by the detector. Since reverse connection of the subscriber loop is detected and corrected inside the network termination device, a communication link between the central office and subscriber terminal can be established regardless of the polarity of the physical connection between them.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A network termination device which recognizes an idle state or a busy state of a subscriber loop by testing the polarity of a supply voltage provided from a central office, comprising:

switching means for switching between normal polarity and reverse polarity of connection to the central office;

detecting means detecting whether the polarity of connection to the central office is normal or reverse; and changing means for changing the polarity of connection by controlling said switching means in accordance with the detection result obtained by said detecting means, said polarity changing occurring automatically at the time of connecting said network termination device with incorrect polarity to said loops, wherein said changing means changes the polarity of connection alternately at predetermined intervals by controlling said switching means, until said detecting means detects that the polarity of connection to the central office is correct.

2. The network termination device according to claim 1, wherein said detecting means determines the polarity of connection as being correct when synchronization with central office is established.

3. The network termination device according to claim 1, wherein:

said detecting means determines at said time of connection whether the polarity of connection to the central office is normal or reverse by testing whether the polarity of the supply voltage successively alternates predetermined times; and said changing means directs said switching means to reverse the polarity of connection, when said detecting means has detected the reverse polarity of connection.

4. The network termination device according to claim 1, further comprising resetting means for resetting a circuit termination unit disposed in the network termination device, when the polarity of the supply voltage supplied from the central office has changed.

5. The network termination device according to claim 1, further comprising power supplying means for producing DC power through full-wave rectification of AC power that is taken from a commercial AC power line, to energize other elements in the network termination device.

* * * * *